(12) United States Patent
Rostami et al.

(10) Patent No.: US 10,313,047 B2
(45) Date of Patent: *Jun. 4, 2019

(54) OPTICAL WAVELENGTH SELECTIVE SWITCH, AN OPTICAL NETWORK NODE, AN OPTICAL NETWORK AND METHODS THEREIN

(71) Applicant: Telefonaktiebolaget LM Ericsson (publ), Stockholm (SE)

(72) Inventors: Ahmad Rostami, Kista (SE); Björn Skubic, Hässelby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/685,385

(22) Filed: Aug. 24, 2017

(65) Prior Publication Data

US 2017/0353263 A1 Dec. 7, 2017

Related U.S. Application Data

(63) Continuation of application No. 14/416,761, filed as application No. PCT/SE2014/051210 on Oct. 13, 2014, now Pat. No. 9,780,904.

(51) Int. Cl.
  *H04J 14/02* (2006.01)
  *H04Q 11/00* (2006.01)
  *G02B 6/35* (2006.01)

(52) U.S. Cl.
  CPC ........ *H04J 14/0212* (2013.01); *H04J 14/022* (2013.01); *H04J 14/0209* (2013.01); *H04J 14/0217* (2013.01); *H04Q 11/0005* (2013.01); *H04Q 11/0067* (2013.01); *G02B 6/356* (2013.01); *G02B 6/3518* (2013.01); *H04Q 2011/003* (2013.01); *H04Q 2011/0016* (2013.01); *H04Q 2011/0026* (2013.01); (Continued)

(58) Field of Classification Search
  CPC ............... H04J 14/0212; H04J 14/0209; H04J 14/0217; H04J 14/022; H04Q 11/0005; H04Q 11/0067; H04Q 2011/0016; H04Q 2011/0092; H04Q 2011/0026; H04Q 2011/003; H04Q 2011/0052; G02B 6/3518; G02B 6/356
  USPC .......................................................... 398/49
  See application file for complete search history.

(56) References Cited

U.S. PATENT DOCUMENTS

| 8,346,089 | B2 | 1/2013 | Wissman |
| 9,780,904 | B2* | 10/2017 | Rostami ............. H04J 14/0212 |

(Continued)

FOREIGN PATENT DOCUMENTS

EP       1674906 A1    6/2006

OTHER PUBLICATIONS

Perrin, S., "The Need for Next-Generation ROADM Networks", White paper, Sep. 1, 2010, pp. 1-15, Heavy Reading.
(Continued)

*Primary Examiner* — Dalzid E Singh
(74) *Attorney, Agent, or Firm* — Coats & Bennett, PLLC

(57) ABSTRACT

A method in an optical Wavelength Selective Switch, WSS, for multidirectional switching of optical signals. The optical WSS comprises a reflective element, a first tributary port and a second tributary port. The optical WSS switches (304) an optical signal between the first tributary port and the second tributary port with the reflective element.

20 Claims, 26 Drawing Sheets

(52) U.S. Cl.
CPC ............... *H04Q 2011/0052* (2013.01); *H04Q 2011/0092* (2013.01)

(56) References Cited

U.S. PATENT DOCUMENTS

| | | | |
|---|---|---|---|
| 2006/0093258 A1* | 5/2006 | Terahara | H04Q 11/0005 385/18 |
| 2007/0172240 A1 | 6/2007 | Terai et al. | |
| 2009/0022489 A1* | 1/2009 | Way | H04J 14/0204 398/4 |
| 2010/0061727 A1* | 3/2010 | Colbourne | H04J 14/0206 398/48 |
| 2013/0034353 A1 | 2/2013 | Shoji et al. | |
| 2014/0023316 A1 | 1/2014 | McLaughlin | |
| 2014/0105600 A1 | 4/2014 | Dahlfort et al. | |
| 2014/0321796 A1* | 10/2014 | Ohtsuka | G02F 1/31 385/3 |
| 2015/0207586 A1 | 7/2015 | Xia et al. | |

OTHER PUBLICATIONS

Kawai, T. et al., "Multi-degree ROADM based on massive port count WSS with integrated Colorless ports." OSA/OFC/NFOEC 2011, Los Angeles, CA Mar. 6-10, 2011. IEEE, Piscataway, NJ.

\* cited by examiner

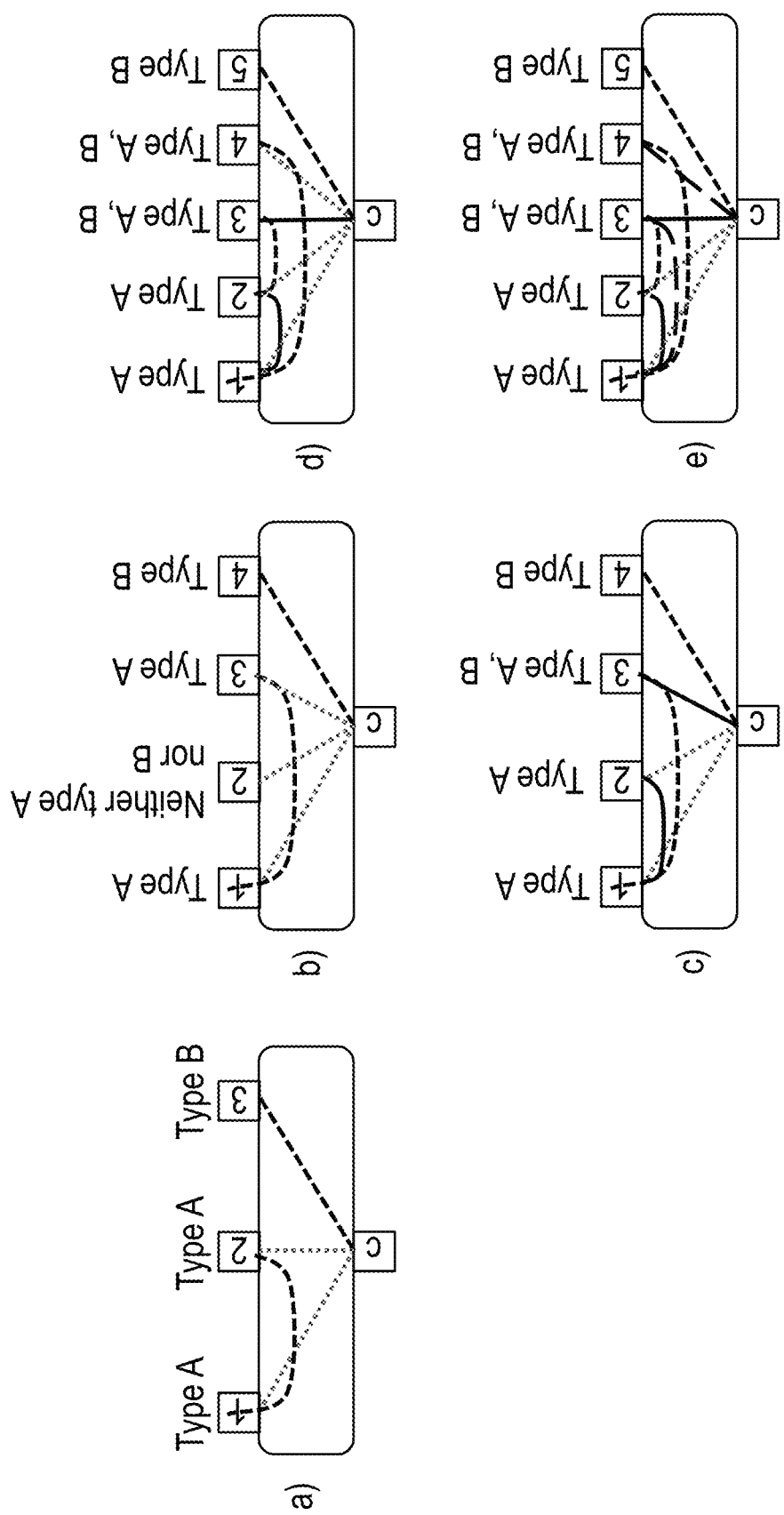
Fig. 8a-e

OPTICAL WAVELENGTH SELECTIVE SWITCH, AN OPTICAL NETWORK NODE, AN OPTICAL NETWORK AND METHODS THEREIN

RELATED APPLICATIONS

This application is a continuation of U.S. application Ser. No. 14/416,761, filed Jan. 23, 2015, which was the National Stage of International Application No. PCT/SE2014/051210, filed Oct. 13, 2014, the disclosures of each of which are incorporated herein by reference in their entirety.

TECHNICAL FIELD

Embodiments herein relate to an optical wavelength selective switch, an optical network node comprising the optical wavelength selective switch, an optical network comprising the optical network node and methods therein. In particular, they relate to switching of optical signals.

BACKGROUND

One of the building blocks of today's optical networks is the Wavelength Selective Switch (WSS). A WSS comprises a common port and several tributary ports for input and output of optical signals to be switched, e.g. Wavelength Division Multiplexing (WDM) channels. In fiber-optic communications WDM is a technology which multiplexes a number of optical carrier signals onto a single optical fiber by using different wavelengths of laser light. This technique enables bidirectional communications over one strand of fiber, as well as multiplication of capacity. Through an electronic control interface, a WSS may be (re)configured to switch or route any of the incoming WDM channels on the common port to one of the tributary ports, irrespective of how other incoming wavelengths are routed. That is, on a single WSS, wavelengths may be routed between the common and tributary ports.

To create a more flexible wavelength routed switch two or more WSS devices may be interconnected in a particular way. Currently, the interconnecting WSS devices is the technology of choice to bring more flexibility to the WDM switching systems for transport networks, e.g. for local interconnection of different access segments in broadband communications networks. A problem with this is the complexity of the architecture and the increased cost due to the use of more than one WSS. That is, the required number of WSS elements and the required number of ports per WSS rapidly increases with the number of directions of an optical interconnect comprising such WSSs.

Optical Cross Connects (OXC) and Re-Configurable Optical Add Drop Multiplexers (ROADM) are examples of basic building blocks of transparent optical networks, which utilize switching in the optical domain. An OXC serves as an interconnection node between a number of fibres and/or directions, capable of routing wavelengths between the different directions in a reconfigurable manner. A degree of the OXC refers to the number of directions that are interconnected at the node. The ROADM may provide similar cross-connect functionality as the OXC and in addition also add/drop of wavelengths to/from local ports.

One of the problems with today's OXCs and ROADMs is the high cost associated with the number of required WSSs and WSS ports for introducing a desired flexibility or re-configurability.

The proliferation of broadband access to the Internet coupled with the introduction of new bandwidth-hungry applications, like video streaming and online gaming, over the last couple of years, have collectively led to an ever-increasing amount of traffic being exchanged inside communications networks, such as the internet. This trend has turned the design and operation of appropriate, cost-efficient transport networks into a major challenge for network operators. One of the main technologies used to realize transport networks is the optical communications and networking, which—thanks to the WDM concept—may provide larger transport capacities at a lower cost compared to the electronics counterparts.

Nonetheless, a problem is that the optical communications and networking technology is somewhat weak in providing flexibility, which is a significant requirement of advanced transport solutions in for example wireless communications networks.

SUMMARY

It is therefore an object of embodiments herein to provide an improved way of switching of optical signals.

According to a first aspect of embodiments herein, the object is achieved by a method in an optical Wavelength Selective Switch, WSS, for multidirectional switching of optical signals. The optical WSS comprises a reflective element, a first tributary port and a second tributary port. The optical WSS switches an optical signal between the first tributary port and the second tributary port with the reflective element.

According to a second aspect of embodiments herein, the object is achieved by an optical WSS according to the first aspect above, for multidirectional switching of optical signals. The optical WSS comprises a reflective element, and a first tributary port and a second tributary port. The optical WSS is adapted to switch an optical signal between the first tributary port and the second tributary port with the reflective element.

According to a third aspect of embodiments herein, the object is achieved by an optical network node for multidirectional switching of optical signals in a communications network. The optical network node comprises one or more optical WSSs according to the second aspect above.

According to a fourth aspect of embodiments herein, the object is achieved by an optical network comprising at least one optical network node, according to the third aspect above. The optical network further comprises a first service node, a second service node, a client node, a first optical access ring and a second optical access ring. The optical network node is connected to the first optical access ring and the second optical access ring. The first service node is connected to the first optical access ring. The first client node is connected to the second optical access ring. The second service node is connected to any other part of the optical network.

The optical network node is configured to route a first optical signal on a first wavelength band between the first service node and the first client node. The optical network node is further configured to route a second optical signal on a second wavelength band between the first service node and the second service node.

Since the WSS switches the optical signal between the first tributary port and the second tributary port with the reflective element the WSS is capable of multidirectional switching of optical signals.

An advantage with embodiments herein is that they enable realizing more complicated network switching functions with fewer numbers of WSSs. This may further reduce signalling in the network as a control module of the switching device will need to keep states for fewer numbers of WSSs and instruct fewer devices.

Specifically, embodiments herein allow switching between tributary ports.

Further, embodiments herein allow utilizing the same subset of wavelength channels for the following two types of WDM connections at the same time and within a single WSS: a) a connection between a first pair of ports, and b) one or more connections—depending on the size of the optical WSS—between second pairs of ports. This could for example be a) a connection between the common port and a certain tributary port, and b) one or more connections—depending on the size of the optical WSS—between pairs of tributary ports.

BRIEF DESCRIPTION OF THE DRAWINGS

Examples of embodiments herein are described in more detail with reference to attached drawings in which:

FIGS. 8a-e are schematic block diagrams depicting optical WSSs according to further embodiments herein.

DETAILED DESCRIPTION

As part of developing embodiments herein, a problem will first be identified and discussed.

Figure 1:
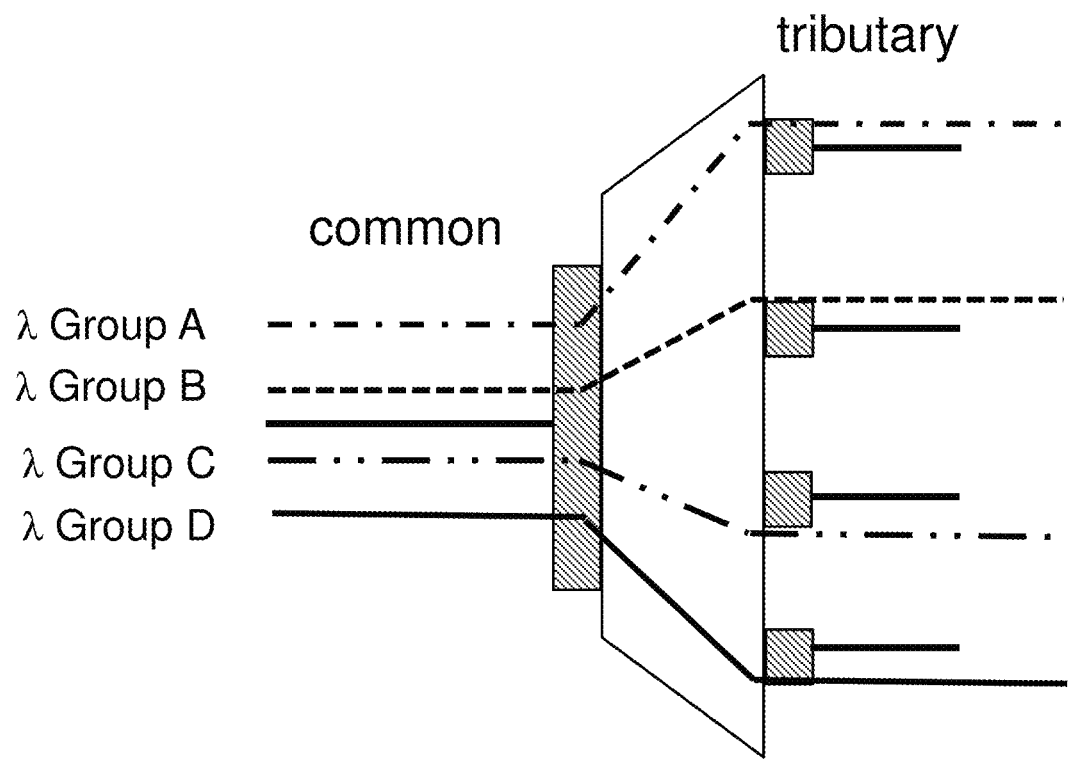
FIG. 1 is a schematic block diagram illustrating a prior art WSS.

In a prior art WSS the various incoming wavelength channels of a common port are dispersed continuously onto a switching element which then directs each of these channels independently to N tributary ports. The switching element may be an array of mirrors, implemented by e.g. Micro Electro Mechanical System (MEMS) mirrors or Liquid Crystal on Silicon (LCoS). The switching element may be configured and reconfigured to direct an optical signal of a particular wavelength or wavelength band injected into the common port into any desired single tributary port. FIG. 1 depicts a prior art WSS.

The mirror configurations may be independently adjusted for different colours of the light, so that different wavelength channels may be independently routed from the common port to any of the tributary ports. Furthermore, the optical WSS architectures are intrinsically bi-directional, so that when a mirror is configured to direct the optical signal of the particular wavelength or wavelength band between the common port and a particular tributary port, the connection on that wavelength may basically be used in both of the directions.

As mentioned above, a more flexible wavelength routed switch may be obtained by interconnecting two or more WSS devices in a particular way. A problem with this is the complexity of the architecture and the increased cost due to the use of more than one WSS. That is, the required number of WSS elements and the required number of ports per WSS rapidly increases with the number of directions of an optical interconnect comprising such WSSs. This problem will now be further illustrated with OXC/ROADM network elements.

There are different ways of realizing OXC/ROADM network elements. One common avenue is by combining multiple WSSs and power splitters to a structure which has the desired wavelength routing properties. A basic 4-degree ROADM may require 4 WSSs, one per direction, and may provide flexible wavelength routing between the different directions. Add/drop functionality may be directionally dependent and constricted to fixed wavelengths. Reconfiguration of the add/drop wavelengths may require manual intervention.

As mentioned above one of the problems with today's OXC/ROADMs is the high cost associated with the number of required WSSs and WSS ports for introducing the desired flexibility/re-configurability.

Additionally, the complexity of control and signalling for ROADM reconfigurations is proportional to the number of employed WSSs.

In embodiments herein an optical WSS for multidirectional switching of optical signals and a method for multidirectional switching of optical signals in the optical WSS will be presented. In embodiments herein, multidirectional switching of optical signals comprises switching optical signals between tributary ports of the WSS. The multidirectional switching of optical signals may also comprise switching a first optical signal on a certain wavelength band between a first pair of ports, and switching a second optical signal within the same wavelength band between a second pair of ports.

Further embodiments will present an optical network node comprising one or more optical WSS with multidirectional switching capabilities. The network node may for example be an OXC or an ROADM comprising two or more WSSs with multidirectional switching capabilities.

Yet further embodiments will present optical networks based on the optical network node.

Figure 2:
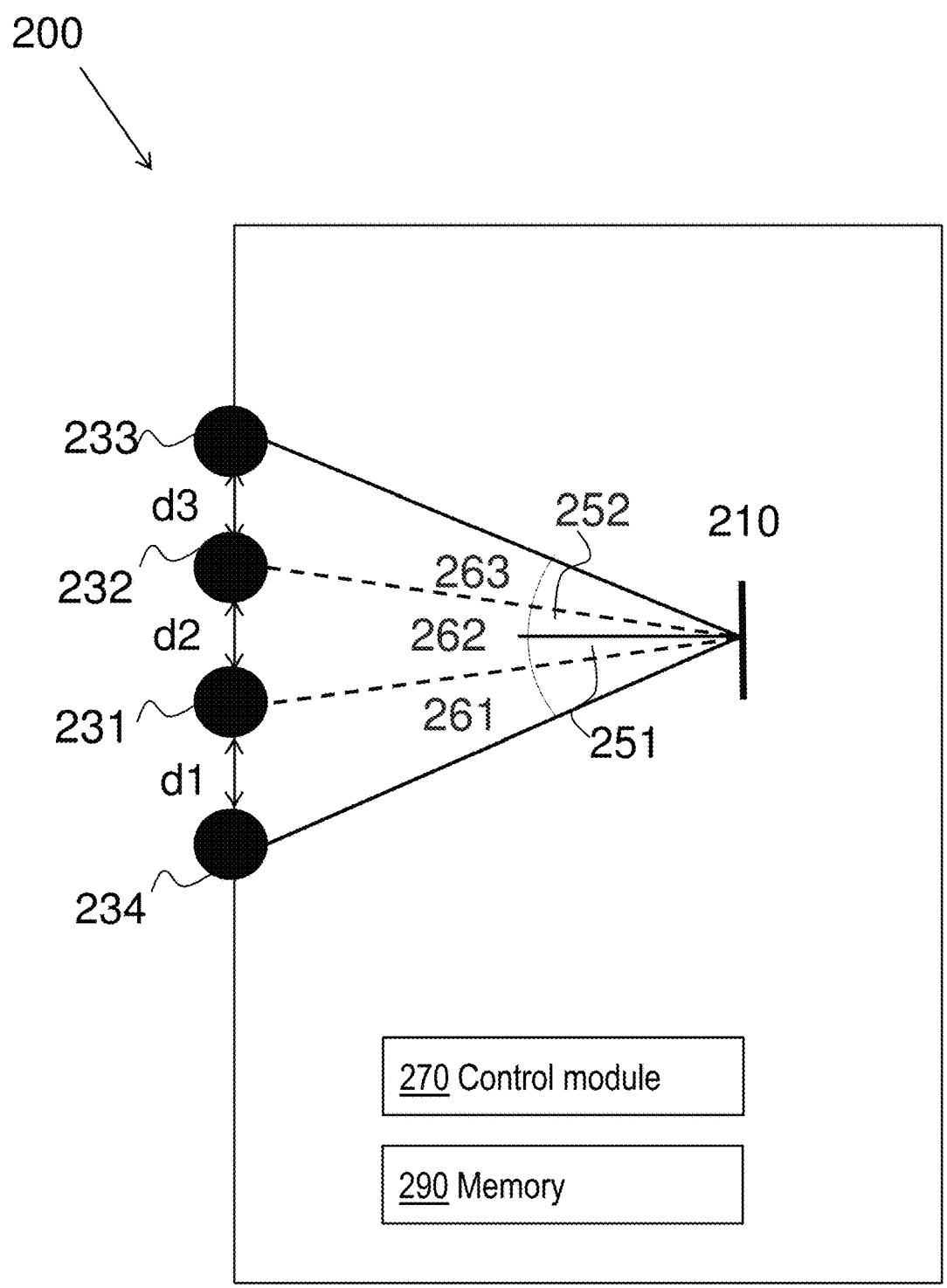
FIG. 2 is a schematic block diagram depicting an optical WSS according to embodiments herein.

FIG. 2 schematically depicts an optical WSS 200 according to embodiments herein. As mentioned above the optical WSS 200 comprises a reflective element 210.

The optical WSS 200 further comprises two or more tributary ports, such as a first tributary port 231, and a second tributary port 232.

In some embodiments the optical WSS 200 comprises further ports. For example in addition to the first tributary port 231 and the second tributary port 232 the optical WSS 200 may comprise a third port 233, such as a third tributary port, and a fourth port 234, such as a fourth tributary port or a common port.

The use of the terms first tributary port, second tributary port, etc. in embodiments herein does not necessarily reflect any positional or functional relation between the ports, but merely indicates that there are two or more ports. Since the number of tributary ports may vary between the embodiments described herein the first tributary port 231, the second tributary port 232, etc. should be seen as logical ports and may symbolise different physical ports.

According to some embodiments the first tributary port 231 is adjacent to the fourth port 234, such as the common port, and the second tributary port 232 may be adjacent to the third port 233, such as the third tributary port.

An optical signal from one of the ports may reach the reflective element 210 and be reflected by the reflective element 210. An incident beam of the optical signal, which is incident on the reflective element 210, and the normal of the effective reflective plane of the reflective element 210 define a first angle 251. A reflected beam of the optical signal, which is reflected from the reflective element 210, and the normal of the effective reflective plane of the reflective element 210 define a second angle 252. In order to switch the optical signal, the reflective element 210 may be adjusted causing the second angle 252 to equal the first angle 251.

In other words, the switching of the optical signal between the first tributary port 231 and the second tributary port 232 may comprise adjusting the reflective element 210, causing the first angle 251, defined by the incident beam of the optical signal, incident on the reflective element 210, and the normal of the effective reflective plane of the reflective element 210, to equal the second angle 252, defined by the normal and the reflected beam of the optical signal, reflected from the reflective element 210.

A third angle 261, 262, 263 is defined by two adjacent optical beams incident on, or reflected from, the reflective element 210.

The optical WSS 200 may be configured to switch a wavelength channel from the common port to any of the tributary ports by adjusting an effective reflective plane of the reflective element 210.

A control module 270 in the optical WSS 200 may be adapted to perform switching by adjusting the reflective element 210. The control module 270 may also be adapted to adjust any other adjustable parameter, e.g. angles or distances.

The optical WSS 200 may further comprise a memory 290.

The optical WSS 200 may be designed in a way that the ports 231, 232, 233, 234 are mechanically placed next to each other in a row with a very small distance d1, d2, d3 from each other.

Figure 3:
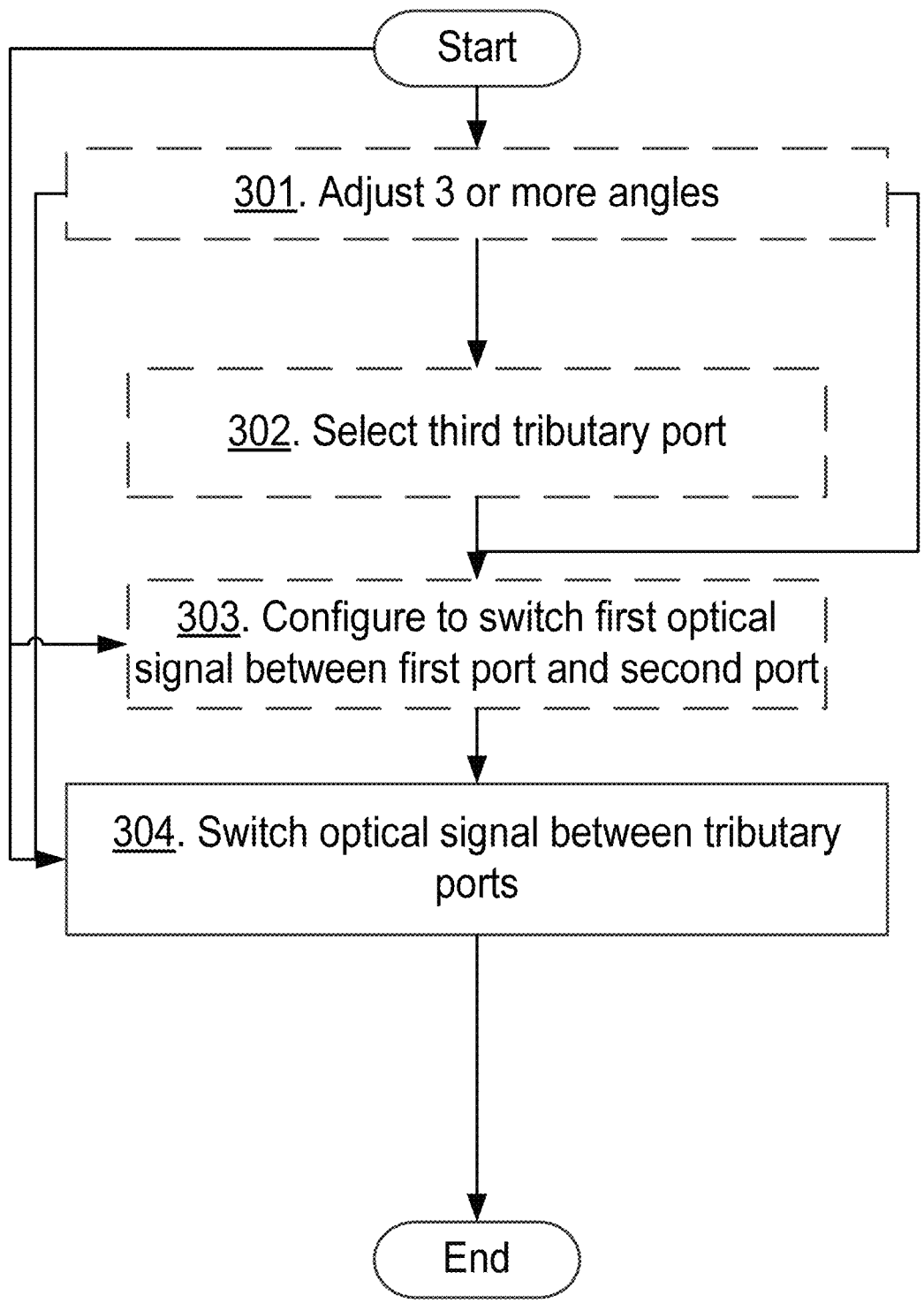
FIG. 3 is a flowchart depicting embodiments of a method in an optical WSS according to embodiments herein.

Embodiments of a method in the optical WSS 200 for multidirectional switching of optical signals will now be described with reference to the optical WSS 200 in FIG. 2 and a flowchart depicted in FIG. 3.

In short, in embodiments herein the optical WSS 200 utilises additional reflections from the reflective element 210 to introduce switching between tributary ports.

When the optical WSS 200 has four or more ports, e.g. the common port and three tributary ports, switching between the first tributary port 231 and the second tributary port 232 may be introduced by configuring the optical WSS 200 to switch between two other ports, e.g. between the common port 234 and the third tributary port 233.

The method comprises the following actions, which actions may be taken in any suitable order.

Action 301

In some embodiments the optical WSS 200 adjusts the three or more third angles 261, 262, 263, causing the three or more third angles 261, 262, 263 to have the same magnitude. This is done to extend the number of ports available for multidirectional switching as will be explained in more detail below. The adjustment of the three or more third angles 261, 262, 263 may for example be implemented by adjusting the distance d1, d2 and d3 between adjacent ports as will be explained in more detail below.

The control module 270 may be adapted to perform action 301.

Action 302

Since multidirectional switching is not achieved between arbitrary ports of the optical WSS 200, the optical WSS 200 may select the ports for multidirectional switching.

In some embodiments the number of ports available for multidirectional switching is limited due to that the three or more third angles 261, 262, 263 do not have the same magnitude, e.g. if the distances d1, d2 and d3 are equal. In those embodiments the optical WSS 200 selects the third port 233 as the tributary port having a largest angle defined by the first angle 251 or the second angle 252. For example, for a 1:3 WSS the WSS 200 selects the third physical tributary port as the third port 233.

The control module 270 may be adapted to perform action 302.

Action 303

As mentioned above, when the optical WSS 200 has four or more ports, e.g. the common port and three tributary ports, switching between the first tributary port 231 and the second tributary port 232 may be introduced by configuring the optical WSS 200 to switch between two other ports, e.g. between the common port 234 and the third tributary port 233.

Thus, before the optical WSS 200 switches the optical signal between the first tributary port 231 and the second tributary port 232, the optical WSS 200 may configure the optical WSS 200 to switch a first optical signal on a specific wavelength band, between the third port 233 and the fourth port 234, with the reflective element 210.

In some embodiments the optical WSS 200 configures the optical WSS 200 to switch the first optical signal between the common port 234 and the third tributary port 233, with the reflective element 210.

The optical WSS 200 may configure the optical WSS 200 to switch the first optical signal between the fourth tributary port 234 and the third tributary port 233, with the reflective element 210.

The control module 270 may be adapted to perform action 303.

Action 304

The optical WSS 200 switches the optical signal between the first tributary port 231 and the second tributary port 232 with the reflective element 210.

In some embodiments the switching of the optical signal between the first tributary port 231 and the second tributary port 232 comprises adjusting the reflective element 210, causing a first angle, defined by the optical path between the first tributary port 231 and the reflective element 210 and the normal of an effective reflective plane of the reflective element 210, to equal a second angle, defined by the normal and the optical path between the reflective element and the second tributary port 232.

When the optical WSS 200 has been configured to switch a first optical signal on a specific wavelength band, between the third port 233 and the fourth port 234, with the reflective element 210, the optical WSS 200 may switch a second optical signal, within the same specific wavelength band, between the first tributary port 231 and the second tributary port 232, with the reflective element 210.

The control module 270 may be adapted to perform action 304.

The reuse of the wavelength may be dynamically reconfigured through the normal control procedure of the optical WSS 200.

To perform the method actions for multidirectional switching of optical signals described above in relation to FIG. 3, the optical WSS 200 comprises the following arrangement depicted in FIG. 2. As mentioned above the optical WSS 200 comprises the reflective element 210, and the first tributary port 231 and the second tributary port 232. The optical WSS 200 may further comprise the third port 233 and the fourth port 234.

In some embodiments the third port 233 is the third tributary port, and the fourth port 234 is the common port.

In some other embodiments the third port 233 is the third tributary port and the fourth port 234 is the fourth tributary port.

The optical WSS 200 is adapted to, e.g. by means of the control module 270 adapted to, switch an optical signal between the first tributary port 231 and the second tributary port 232 with the reflective element 210.

In some embodiments the optical WSS 200 is adapted to, e.g. by means of the control module 270 adapted to, switch the optical signal between the first tributary port 231 and the second tributary port 232 by adjusting the reflective element 210, causing the first angle 251, defined by the incident beam of the optical signal, incident on the reflective element 210, and the normal of an effective reflective plane of the reflective element 210, to equal the second angle 252, defined by the normal and a reflected beam of the optical signal, reflected from the reflective element 210.

When the optical WSS 200 further comprises the third port 233 and the fourth port 234, the optical WSS 200 may be adapted to configure the optical WSS 200 to switch the first optical signal on the specific wavelength band, between the third port 233 and the fourth port 234, with the reflective element 210, and switch the second optical signal, within the same specific wavelength band, between the first tributary port 231 and the second tributary port 232, with the reflective element 210.

The optical WSS 200 may be further adapted to, e.g. by means of the control module 270 adapted to, switch the second optical signal between the tributary port 231 adjacent to the common port 234 and the tributary port 232 adjacent to the third tributary port 233.

The optical WSS 200 may further be adapted to, e.g. by means of the control module 270 adapted to, select the third port 233 as the tributary port having the largest angle defined by the first angle 251 or the second angle 252.

In some embodiments the optical WSS 200 is further adapted to, e.g. by means of the control module 270 adapted to, adjust the three or more third angles 261, 262, 263 to have the same magnitude.

The optical WSS 200 may further be adapted to, e.g. by means of the memory 290 adapted to, store e.g. the angles, the distances etc. The memory 290 comprises one or more memory units. The memory 290 is further adapted to store configurations and applications to perform the methods herein when being executed in the optical WSS 200.

In the following detailed embodiments a first physical tributary port will be referred to with reference numeral 1. Likewise a second, third and following physical tributary ports will be referred to with reference numerals 2, 3, etc. The common port will be referred to with reference c. In the following embodiments the term physical reflects the positional hierarchy between the tributary ports of the optical WSS.

Figure 4A:
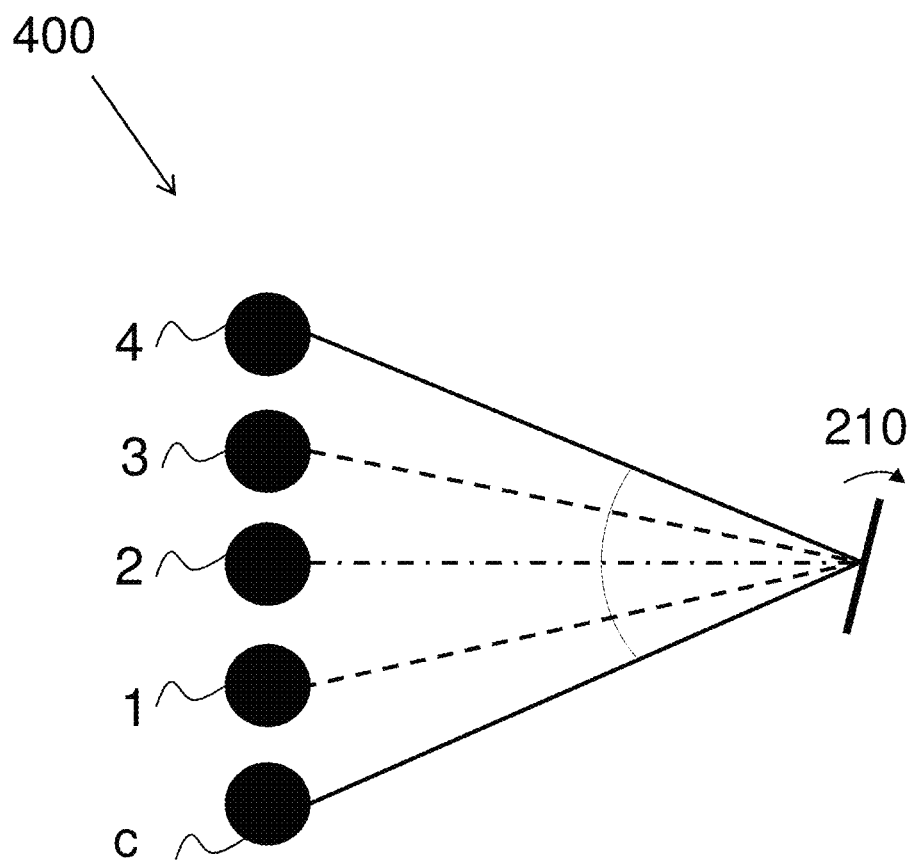
FIG. 4a is a schematic block diagram depicting an optical WSS according to further embodiments herein.

FIG. 4a schematically depicts a 1:4 optical WSS 400 according to some first embodiments herein. As mentioned above the 1:4 optical WSS 400 comprises the reflective element 210.

The 1:4 optical WSS 400 further comprises the common port c.

The 1:4 optical WSS 400 further comprises a first physical tributary port 1, a second physical tributary port 2, a third physical tributary port 3 and a fourth physical tributary port 4. The term physical reflects the positional hierarchy between the tributary ports of the 1:4 optical WSS 400.

The first embodiments herein utilise so-called unwanted reflections between pairs of the four tributary ports as an additional switching capability. The 1:4 optical WSS 400 in FIG. 4a will be used as an example. When the 1:4 optical WSS 400 is configured to route or switch a given number of wavelength channels between the common port c and the fourth physical tributary port 4, then the same wavelength channels are reused between a pair of tributary ports, such as the first physical tributary port 1 and the third physical tributary port 3, for additional connections.

Due to the nature of the internal architecture of the optical WSS 200, 400 there is no perfect isolation among WSS ports and additional reflections may occur. These reflections are usually considered as "unwanted" and efforts are usually made to minimize them as much as possible. Embodiments herein utilize such "unwanted" reflections in a constructive way, and thereby enhancing the switching functionality of the optical WSS 200, 400. More specifically, the optical WSS 200, 400 may be designed in a way that the ports are mechanically placed next to each other in a row with very small distance from each other. This setting contributes to the so-called unwanted reflections. In FIG. 4a, the reflective element 210 is configured to route the wavelength channel from the common port c to the fourth physical tributary port 4. The side effect of this configuration is, however, that for the same wavelength channel there will be self-reflection for the central tributary port, i.e. the second physical tributary port 2, and reflection between the first physical tributary port 1 and the third physical tributary port 3.

Note that although the example is based on a 1:4 WSS, the same phenomenon is present in larger and smaller WSSs. For instance, configuring a 1:9 WSS to route a specific wavelength from the common port to port 9, then on the same wavelength there will be reflections between the pairs of ports (1,8), (2,7), (3,6) and (4,5). Self-reflection occurs for port N/2 when N is an even number.

Figure 4B:
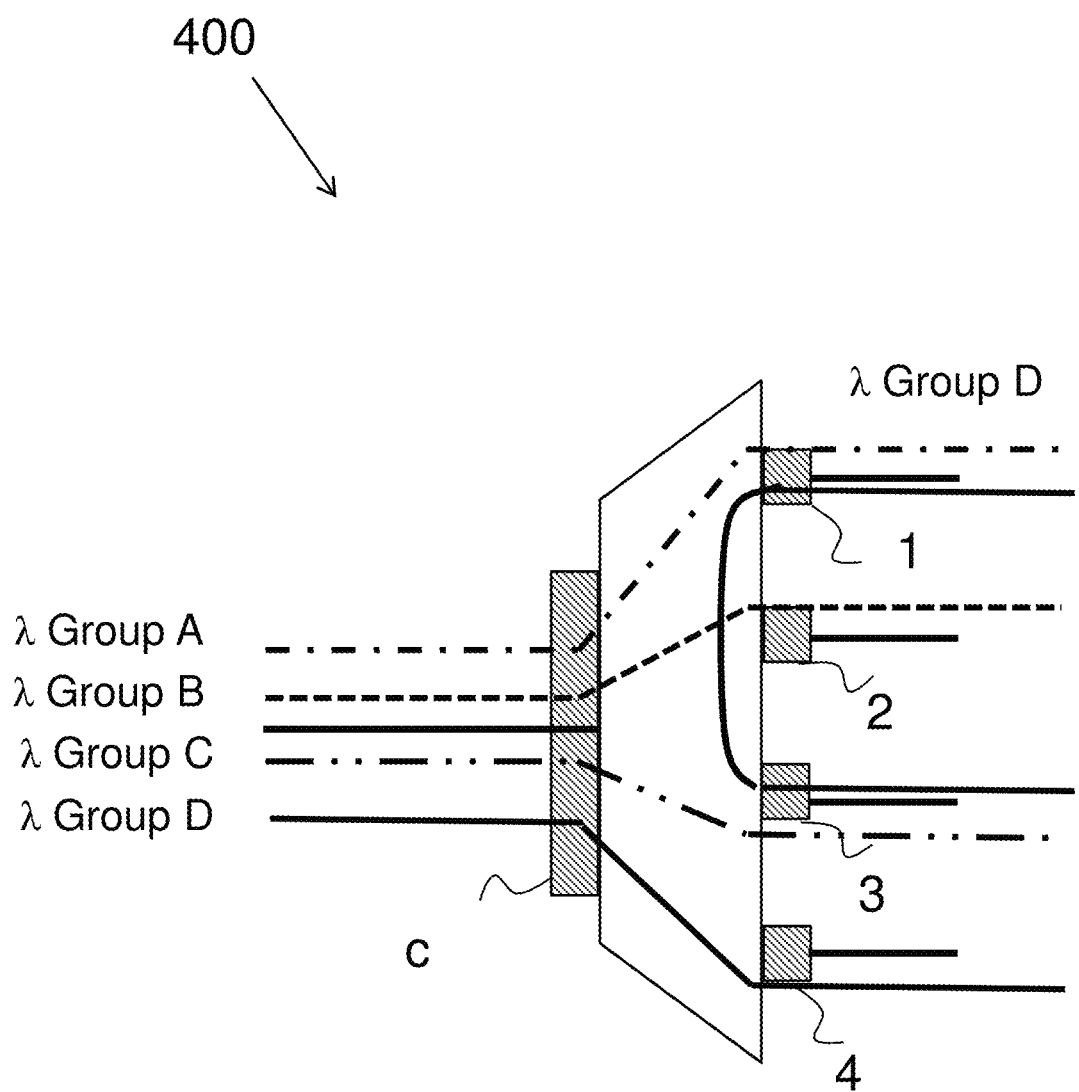
FIG. 4b is a schematic block diagram depicting an optical WSS according to further embodiments herein.

The first embodiments has been further illustrated in FIG. 4b, where it is assumed that all the wavelength channels of the WDM link may be divided into 4 disjoint groups of A, B, C and D. Any of the wavelengths belonging to any of the four groups may be independently routed between the common port c and any physical tributary port 1, 2, 3, 4 of the 1:4 optical WSS 400. The same wavelength channels that are routed between the common port c and the fourth physical tributary port 4, i.e., channel group D in this example, is reused to provide a switching capability between the physical second tributary port 2 and the third physical tributary port 3. With this configuration the switching capacity between the common port c and the first physical tributary port 1 will be equal to that between the second physical tributary port 2 and the third physical tributary port 3.

Some second embodiments will now be described with reference to FIG. 4a. As mentioned above the optical 1:4 optical WSS 400 comprises the reflective element 210, the first physical tributary port 1, the second physical tributary port 2, the third physical tributary port 4 and the fourth physical tributary port 4. The optical WSS 400 may comprise a common port c.

In the second embodiments the 1:4 optical WSS 400 is configured to switch a first optical signal within a specific wavelength band between the first physical tributary port 1 and the fourth physical tributary port 4, with the reflective element 210.

Then the 1:4 optical WSS 400 may further switch a second optical signal, within the same specific wavelength band, between the second physical tributary port 2 and the third physical tributary port 4, with the reflective element 210.

This embodiment may be implemented by rotating the reflective element 210 in a direction causing the angle defined by the optical path between the common port c and the reflective element 210, and the normal of the effective reflective plane to be smaller than the angle needed for switching between the common port c and the tributary port with the largest angle towards the normal, i.e. the fourth physical tributary port 4 in FIG. 4a. In FIG. 4a the reflective element is rotated in a direction causing the normal of the reflective pane to move away from the common port c.

Figure 5:
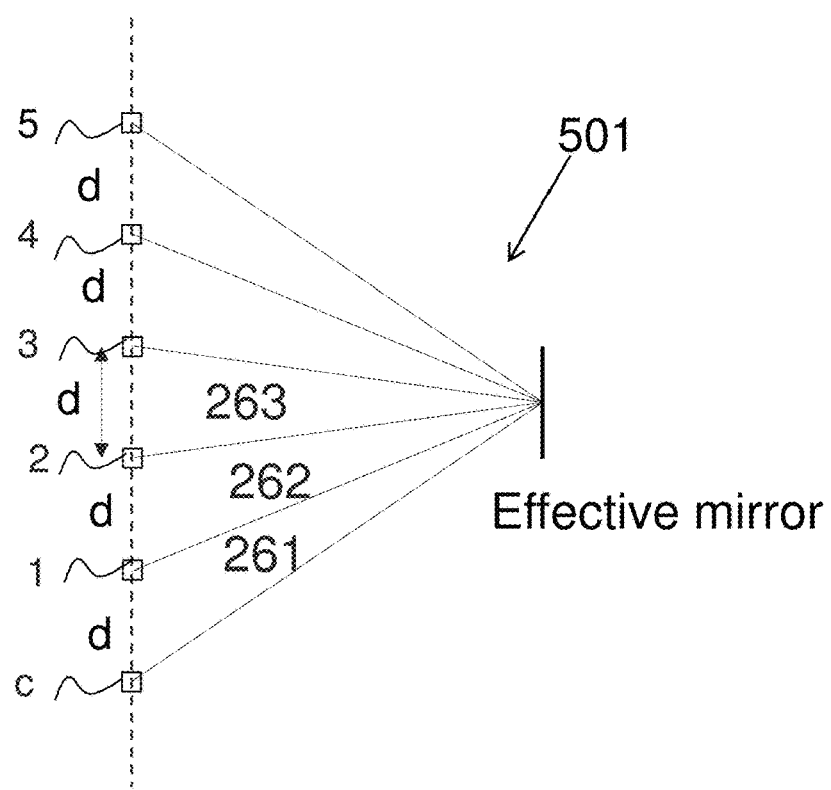
FIG. 5 is a schematic block diagram depicting an optical WSS according to further embodiments herein.

Some third embodiments will now be described with reference to FIGS. 5 and 6. FIG. 5 schematically presents a first 1:5 optical WSS 501 with equal distances d between all ports. The first 1:5 optical WSS 501 comprises a fifth physical tributary port 5. The number of tributary ports that may offer multidirectional switching for the same wavelength band is limited if the distances between the ports are equal. Equal distances results in that adjacent third angles 261, 262 are different. When the adjacent third angles are different the first 1:5 optical WSS 501 may perform additional switching on the same wavelength band between the tributary port adjacent to the common port and the tributary port adjacent to the tributary port having the largest angle defined by the optical path between the tributary port and the normal of the effective reflective plane of the reflective element 510. In other words, for the first 1:5 optical WSS 501 this means that switching on the same wavelength band is possible between the first physical tributary port 1 and the fourth physical tributary port 4 when the first 1:5 optical WSS 401 is configured to switch between the common port c and the fifth physical tributary port 5.

Figure 6:
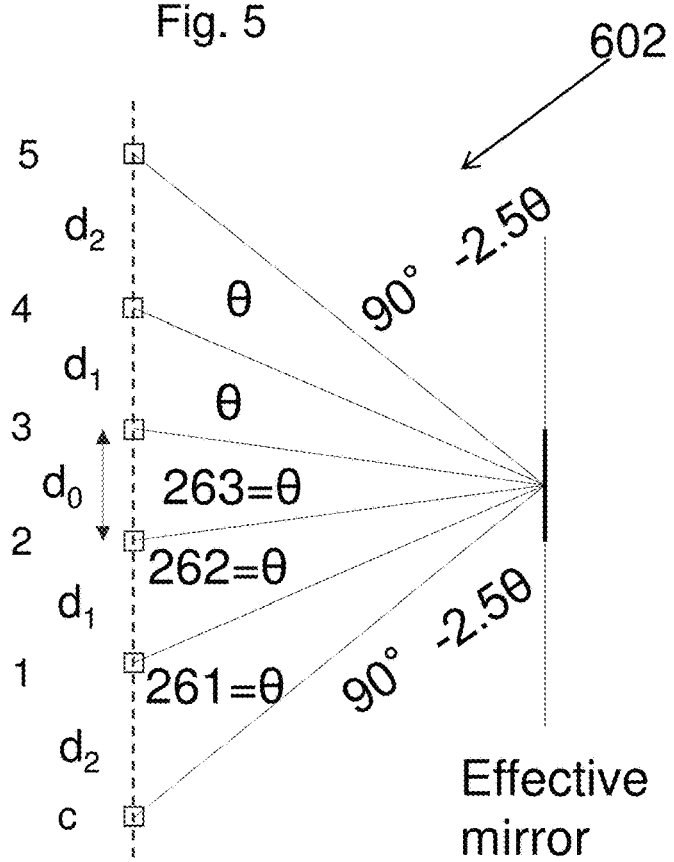
FIG. 6 is a schematic block diagram depicting an optical WSS according to further embodiments herein.

FIG. 6 schematically presents a second 1:5 optical WSS 602 with enhanced multidirectional switching capabilities. In order to perform multidirectional switching between more ports than is possible with the first 1:5 optical WSS 501, the second 1:5 optical WSS 602 may adjust the three or more third angles 261, 262, 263, causing the three or more third angles 261, 262, 263 to have the same magnitude. The magnitude is indicated in FIG. 6 as θ.

This may for example be implemented by adjusting the distance d0, d1, d2 between adjacent ports.

Table 1 presents the possible multidirectional switching functions in the second 1:5 optical WSS 602 following the architecture of FIG. 6. The right column lists additional multidirectional functions that are possible with a given configuration of the second 1:5 optical WSS 602 in the left column. For example, if the second 1:5 optical WSS 602 is configured to route between the common port c and the fourth physical tributary port 4, it would be possible to utilize the first physical tributary port 1 and the third physical tributary port 3 for additional connections on the same wavelength.

TABLE 1

| Configured to switch | Additional Multidirectional Switching |
|---|---|
| c ↔ 5 | 1 ↔ 4 and 2 ↔ 3 |
| c ↔ 4 | 1 ↔ 3 |
| c ↔ 3 | 1 ↔ 2 |

Some fourth embodiments comprise one or more combinations of the previous embodiments. For example, an optical WSS with equal third angles and configured to switch two or more optical signals within the same wavelength band between two or more pairs of tributary ports.

Figure 7A:
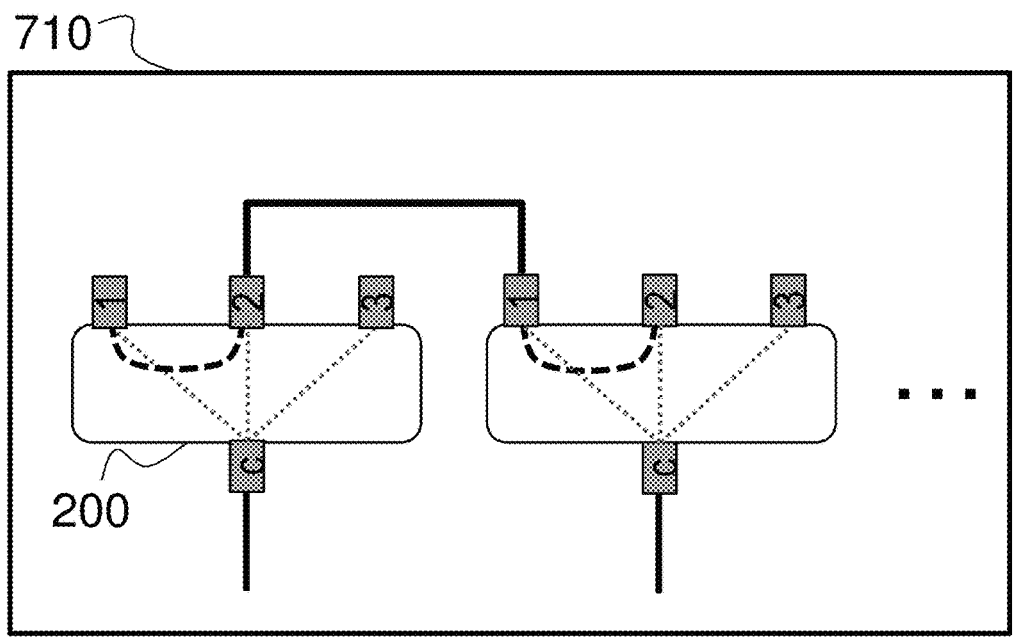
FIG. 7a is a schematic block diagram depicting embodiments of an optical network node comprising multiple optical WSSs according to embodiments herein.

Embodiments herein are also directed to an optical network node 710 comprising one or more optical WSS 200 as illustrated in FIG. 7*a*.

In the following a number of embodiments of the optical network node 710 comprising the one or more optical WSS 200 will be presented.

Figure 7B:
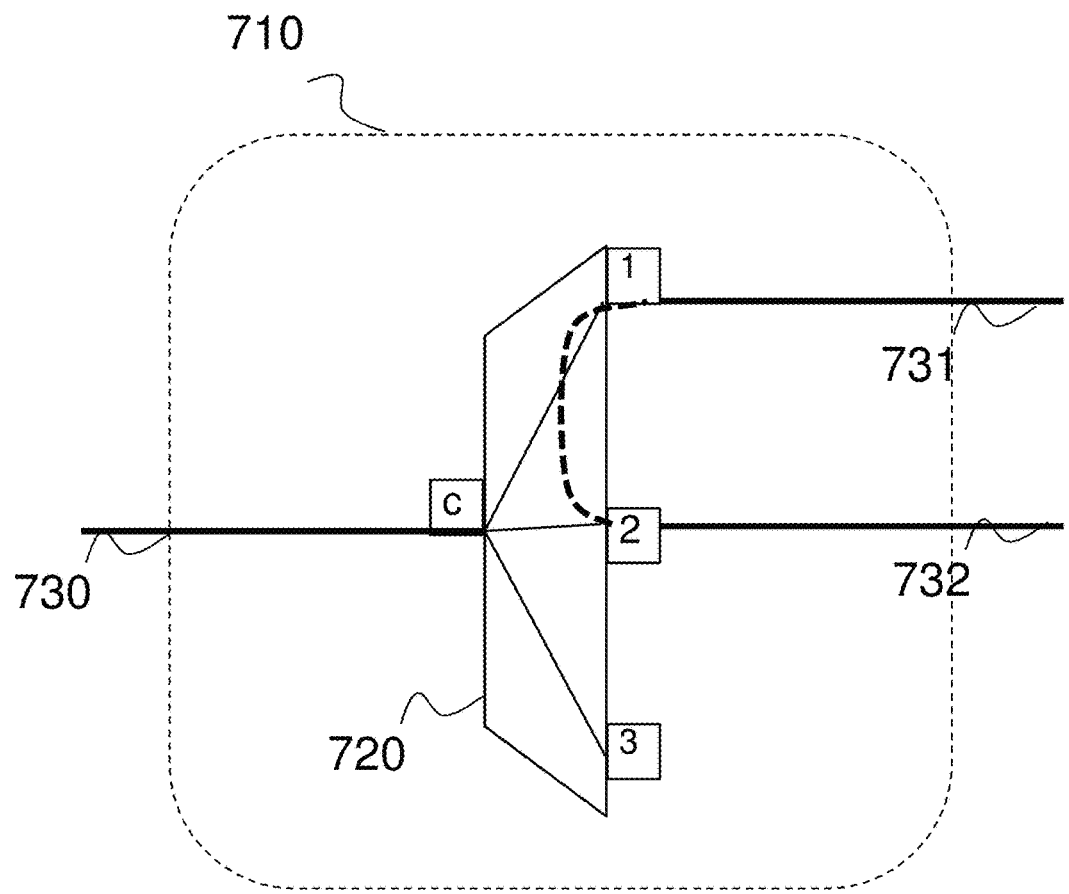
FIG. 7b is a schematic block diagram depicting embodiments of an optical network node comprising an optical WSS according to embodiments herein.

FIG. 7*b* illustrates an example of a 3×3 optical network node comprising a 1:3 multidirectional optical WSS according to embodiments herein.

Thanks to the utilization of the connectivity between tributary ports, the 1:3 multidirectional optical WSS may be used to route the traffic from any of the 3 I/O ports 730, 731, 732 of the structure to any other I/O port when the 1:3 multidirectional optical WSS is used in a bidirectional mode.

An optical network node according to embodiments herein do not need more than one WSS to realize this functionality. This means that more flexible optical routers may be built with less number of WSS devices, and therefore at a lower cost.

FIG. 8*a* to 8*e* illustrates some properties of the optical WSS according to embodiments herein.

FIG. 8*a* illustrates an optical WSS 810 of size 1:3. FIG. 8*b* illustrates an optical WSS 820 of size 1:4 without support for connectivity between physical tributary ports 1 and 2. FIG. 8*c* illustrates a WSS 830 of size 1:4 with support for connectivity between physical tributary ports 1 and 2. FIG. 8*d* illustrates a WSS 840 of size 1:5 without support for connectivity between physical tributary ports 2 and 3. FIG. 8*e* illustrates a WSS 850 of size 1:5 with support for connectivity between physical tributary ports 2 and 3.

In contrast to the prior art WSS, a tributary port in embodiments herein may additionally exhibit the following properties.

Type A: An optical signal may be routed between the considered tributary port, for example the physical tributary port 1 and another tributary port, such as the physical tributary port 2, through the multidirectional optical WSS 200.

Type B: Routing of a first optical signal between the considered tributary port and another port, such as a common port c or another tributary port, introduces connectivity for a second optical signal within the same wavelength band between two other tributary ports.

A WSS tributary port may possess either properties type A or B, both A and B or neither A nor B as illustrated for different types of WSSs in FIG. 8*a* to 8*e*.

The switching behaviour described by embodiments herein makes cascading of such WSSs by interconnecting them via the tributary ports interesting. In embodiments below two basic ways of cascading such WSSs along the tributary ports will be described.

Figure 9A:
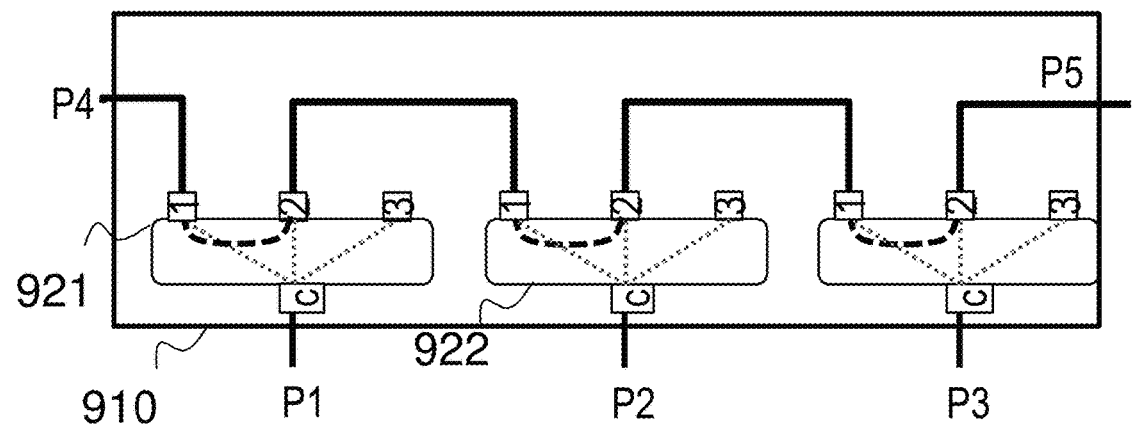
FIG. 9a is a schematic block diagram depicting embodiments of an optical network node comprising multiple optical WSSs according to embodiments herein.

FIG. 9*a* illustrates the optical network node 910 comprising a first optical WSS 921 and a second optical WSS 922, each according to embodiments herein, such as the optical WSS 200.

The optical network node 910 may be adapted to switch an optical signal from at least one tributary port, such as from the first physical tributary port 1, via the second physical tributary port 2, comprised in the first optical WSS 921 to at least one tributary port, such as via the first physical tributary port 1 to the second physical tributary port 2, comprised in the second optical WSS 922.

Figure 9B:
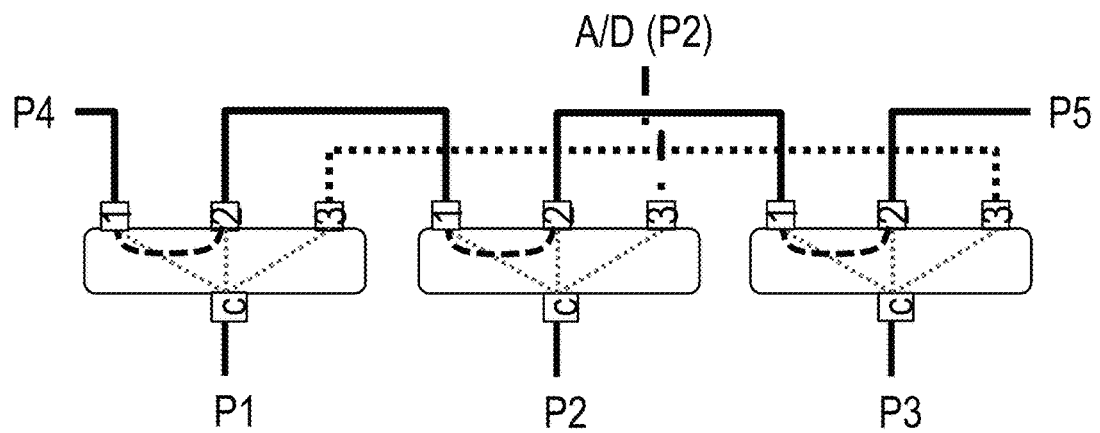
FIG. 9b is a schematic block diagram depicting further embodiments of an optical network node comprising multiple optical WSSs according to embodiments herein.

A first scheme of cascading WSSs is through connecting tributary ports of type A as in FIG. 9*a*. FIG. 9*a* illustrates three multidirectional 1:3 WSSs with the first tributary port 1 and the second tributary port 2, each of type A. The third tributary port 3 is of type B. By generalizing to M WSSs, this way of cascading the WSSs creates a chain of M WSSs where optical signals within a wavelength band may be routed through the full WSS chain. Assuming that end points P4 and P5 of this chain and common ports P1, P2 and P3 may be utilized as in/outgoing ports of the structure, the structure constitutes an OXC with M+2 ports based on only M WSSs. As illustrated in FIG. 9*a* a wavelength band may be routed between any pair of in/outgoing ports of the OXC. For the simple configuration depicted in FIG. 9*a*, there are however several constraints in terms of internal wavelength blocking. However, additional WSS ports may be used to relieve some of the blocking constraints as depicted in FIG. 9*b* with a dotted line between two of the third tributary ports 3. Alternatively, depicted with a dash-dotted line and A/D (P2), some directional add/drop functionality may be introduced.

In some embodiments the optical network node 910 is further adapted to switch the optical signal from any one or more of the first tributary port 231, such as the first physical tributary port 1, and the second tributary port 232, such as the second physical tributary port 2, comprised in a first optical WSS 921 to any one or more of the first tributary port 231, such as the first physical tributary port 1, and the second tributary port 232, such as the second physical tributary port 2, comprised in the second optical WSS 922.

Figure 10A:
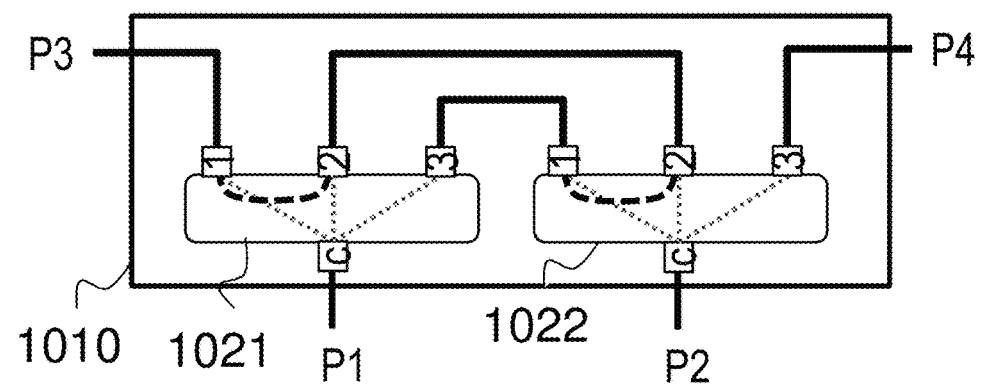
FIG. 10a is a schematic block diagram depicting further embodiments of an optical network node comprising multiple optical WSSs according to embodiments herein.

A second scheme of cascading the WSSs via the tributary ports is by alternatingly connecting ports of Type A with ports that are not of type A. This is illustrated in FIG. 10*a* for the case of connecting two 1:3 WSSs. The second scheme creates a structure with different connectivity properties compared to the first scheme of cascading the WSSs. FIG. 10*a* illustrates a structure with full non-blocking connectivity within in/outgoing ports P1, P2, P3 as well as within in/outgoing ports P1, P2, P4. This structure may be used to provide a fully non-blocking 2-degree ROADM with 2 add/drop ports.

Note that for the second scheme of cascading ideally at least two connections are provided between neighbouring WSSs. For the 1:3 WSS, two connections may be made to one next neighbour.

Figure 10B:
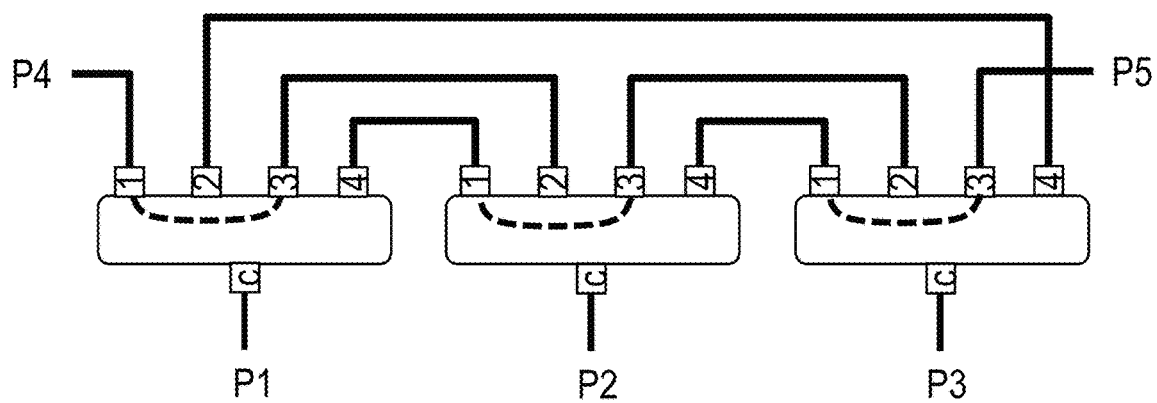
FIG. 10b is a schematic block diagram depicting further embodiments of an optical network node comprising multiple optical WSSs according to embodiments herein.

Extending the number of WSS ports as in FIG. 10*b* may relieve some of the wavelength blocking constraints. FIG. 10*b* illustrates cascading WSSs of size 1:4 via tributary ports by connecting ports of type A with ports not of type A. Two connections between each neighbouring WSS are provided.

In other words, the optical network node 1010 may comprise two connections between the first optical WSS 1021 and the second optical WSS 1022. The optical network node 1010 may further be adapted to switch the optical signal from the fourth port 234, such as the common port c, of the first optical WSS 1021, via the third port 233, such as the third physical tributary port 3, of the first optical WSS 1021, to any one of the first tributary port 231, such as the first physical tributary port 1, and the second tributary port 232, such as the second physical tributary port 2, of the second optical WSS 1022.

Based on the two basic schemes for cascading WSSs with multidirectional wavelength switching capabilities, several important building blocks for single fiber transmission based transparent optical networks may be built with fewer WSSs or with fewer WSS ports as compared to today's alternatives. Examples are described below.

Figure 11A:
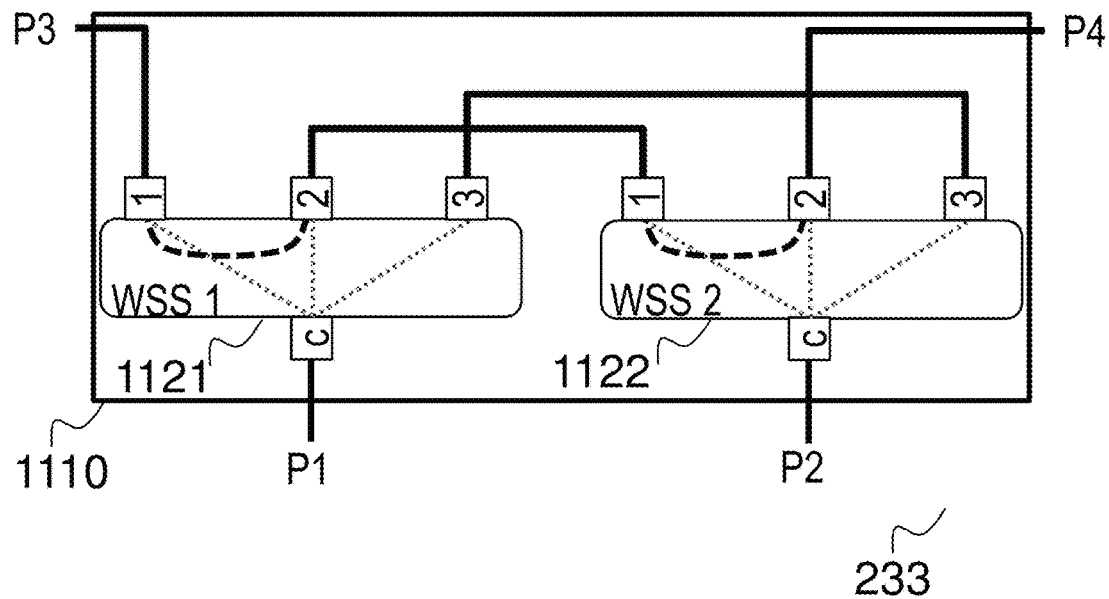
FIG. 11a is a schematic block diagram depicting embodiments of a 4×4 OXC comprising multiple optical WSSs according to embodiments herein.

In FIG. 11a the optical network node 710, 1110 is a 4×4 OXC comprising two 1:3 WSSs, namely a first 1:3 WSS 1121 and a second 1:3 WSS 1122 according to embodiments herein. The 4×4 OXC is based on cascading through the first cascading scheme.

Figure 11B:
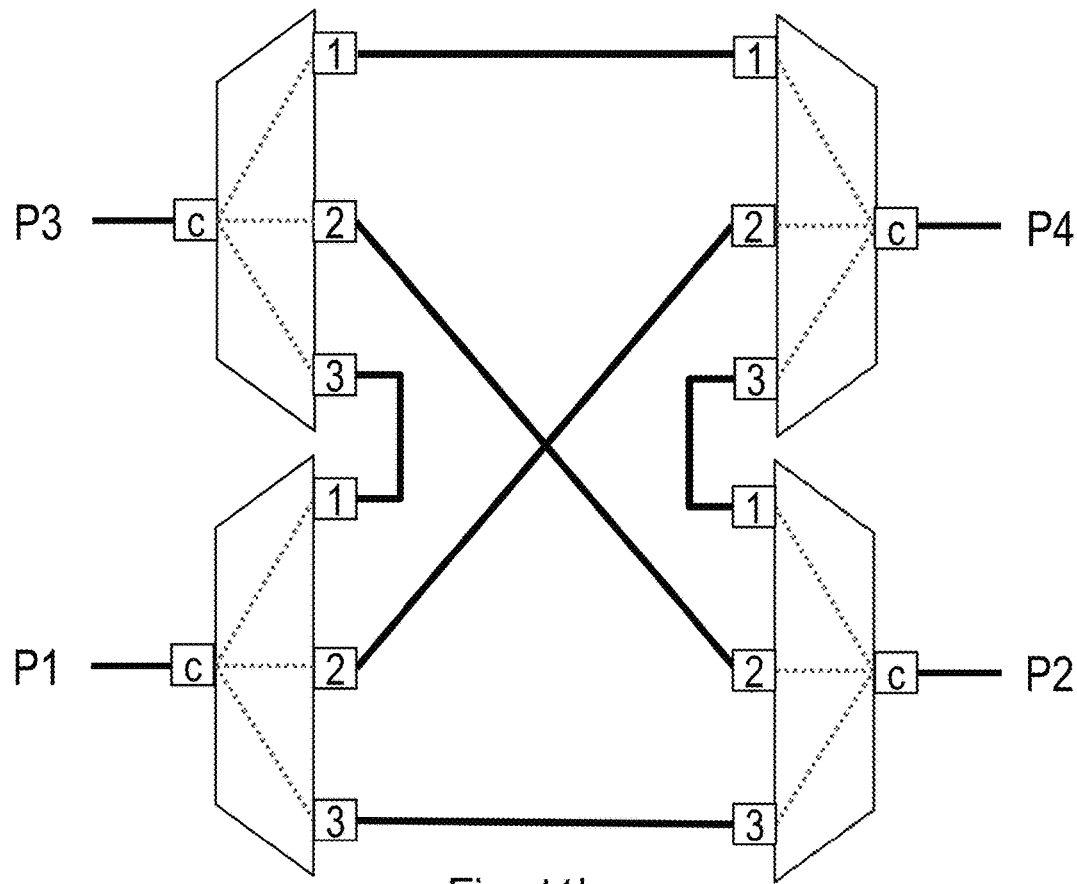
FIG. 11b is a schematic block diagram depicting a prior art 4×4 OXC comprising optical WSSs according to embodiments herein.

WSS settings that provide connectivity between different OXC ports are displayed in Table 2. Table 2 is presented in the format (a:b), where 'a' represents routing of a considered wavelength between the common port c and port 'a' for the first 1:3 WSS 1121 and where 'b' represents routing of considered wavelength between the common port c and port 'b' for the second 1:3 WSS 1122. X denotes any port. Note that the only blocking constraint is for routing a wavelength between port pairs P2-P3 and P1-P4 simultaneously, while all other combinations are fully non-blocking. FIG. 11b presents a conventional 4×4 OXC. Compared to the conventional 4×4 OXC, which is fully non-blocking, the number of WSSs is reduced by 50% in embodiments herein.

TABLE 2

| Port | P1 | P2 | P3 | P4 |
| --- | --- | --- | --- | --- |
| P1 | — | 3:3, 2:1 | 1:x | 2:3 |
| P2 | 3:3, 2:1 | — | 3:1 | X:3 |
| P3 | 1:x | 3:1 | — | 3:3 |
| P4 | 2:3 | X:3 | 3:3 | — |

In other words, when the optical network node 710, 1110 is the 4×4 OXC, each WSS 1121, 1122 may comprise three tributary ports. The third tributary port 233, such as the third physical tributary port 3, comprised in the first optical WSS 1121 may be connected to another third tributary port 233, such as the third physical tributary port 3, comprised in the second optical WSS 1122. The optical network node 1110 further comprises four combined input and output ports:

a first input and output port P1 connected to the common port 234, c comprised in the first optical WSS 1121, a second input and output port P2 connected to the common port 234, c comprised in the second optical WSS 1122, a third input and output port P3 connected to the first tributary port 231, such as the first physical tributary port 1, or the second tributary port 232, such as the second physical tributary port 2, comprised in the first optical WSS 1121, and a fourth input and output port P4 connected to the first tributary port 231, such as the first physical tributary port 1, comprised in the second optical WSS 1102, or the second tributary port 232, such as the second physical tributary port 2 comprised in the second optical WSS 1102.

Figure 12A:
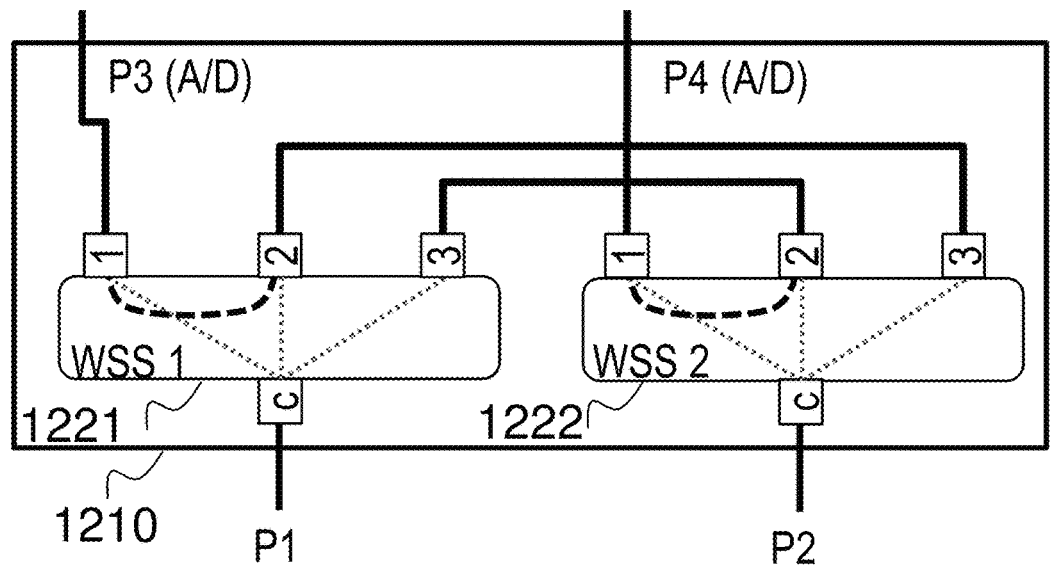
FIG. 12a is a schematic block diagram depicting embodiments of a 2D ROADM comprising multiple optical WSSs according to embodiments herein.

In FIG. 12a the optical network node 1210 is a 2D-ROADM comprising two 1:3 WSSs, namely the first 1:3 WSS 1221 and the second 1:3 WSS 1222 according to embodiments herein. The 2D-ROADM is based on cascading through the second cascading scheme.

WSS settings that provide connectivity between different ports of the 2D-ROADM are displayed in Table 3. Table 3 is presented in the format a:b, where 'a' represents routing of the considered wavelength between the common port c and port 'a' for the first 1:3 WSS 1221. 'b' represents routing of the considered wavelength between the common port c and port 'b' for the second 1:3 WSS 1222.

Figure 12B:
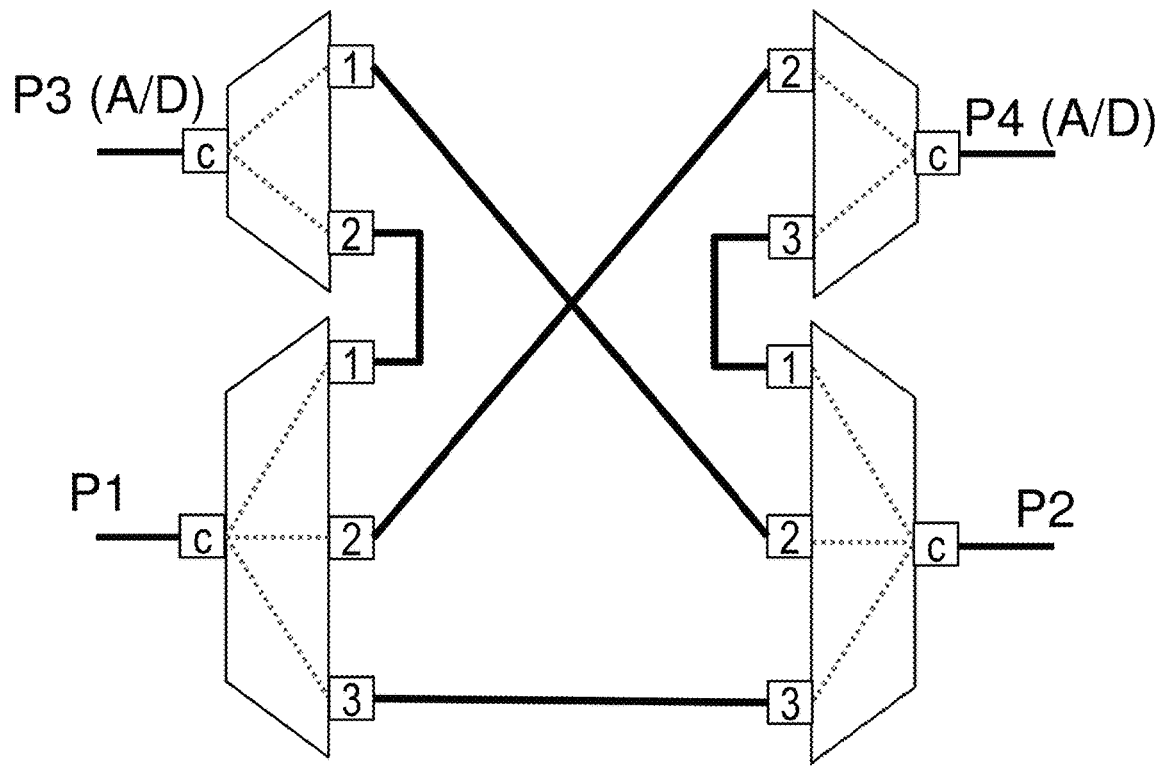
FIG. 12b is a schematic block diagram depicting a prior art 2D ROADM comprising multiple WSSs.

FIG. 12b presents a conventional 2D-ROADM. Compared to the conventional 2D-ROADM which provides identical functionality, embodiments herein reduce the number of WSSs by two.

TABLE 3

| Port | P1 | P2 | P3 (A/D) | P4 (A/D) |
| --- | --- | --- | --- | --- |
| P1 | — | 3:2, 2:3 | 1:x | 3:3 |
| P2 | 3:2, 2:3 | — | 3:3 | X:1 |
| P3 | 1:x | 3:3 | — | — |
| P4 | 3:3 | X:1 | — | — |

In other words, when the optical network node 710, 1210 is a 2D-ROADM, the optical network node 1210 further comprises four combined input and output ports P1, P2, P3, P4:

the first input and output port P1 connected to the common port 234, c comprised in the first optical WSS 1221, the second input and output port P2 connected to the common port 234, c comprised in the second optical WSS 1222, the third input and output port P3 connected to the first tributary port 231, such as the first physical tributary port 1, or the second tributary port 232, such as the second physical tributary port 2, comprised in the first optical WSS 1221, and the fourth input and output port P4 connected to the first tributary port 231, such as the first physical tributary port 1 or the second tributary port 232, such as the second physical tributary port 2, comprised in the second optical WSS 1222.

Figure 13A:
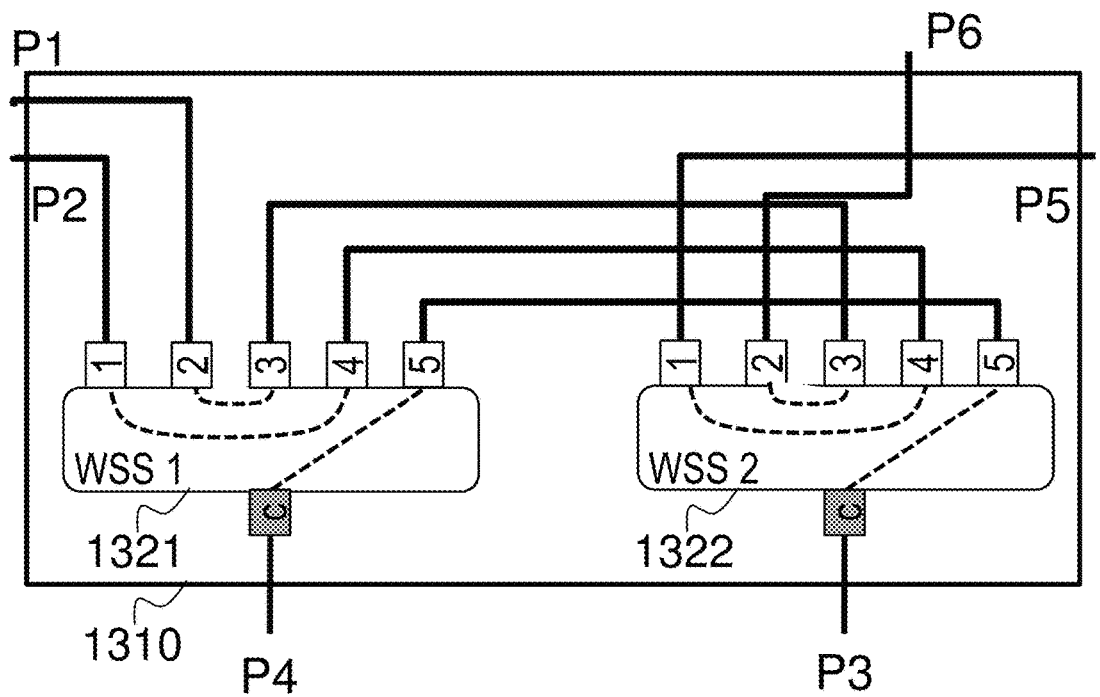
FIG. 13a is a schematic block diagram depicting embodiments of a 6×6 OXC comprising multiple optical WSSs according to embodiments herein.

In FIG. 13a the optical network node 1310 is a 6×6 OXC comprising two cascaded multidirectional 1:5 WSSs 1321, 1322. The 6×6 OXC comprises six input and output ports P1-P6.

Note that for the 1:5 WSS 1321, 1322, when a given wavelength is routed between the common port c and a fifth physical tributary port 5, the 1:5 WSS 1321, 1322 also provides connectivity between the first physical tributary port 1 and the fourth physical tributary port 4 as well as between the second physical tributary port 2 and the third physical tributary port 3, illustrated with dashed lines in FIG. 13a.

Figure 13B:
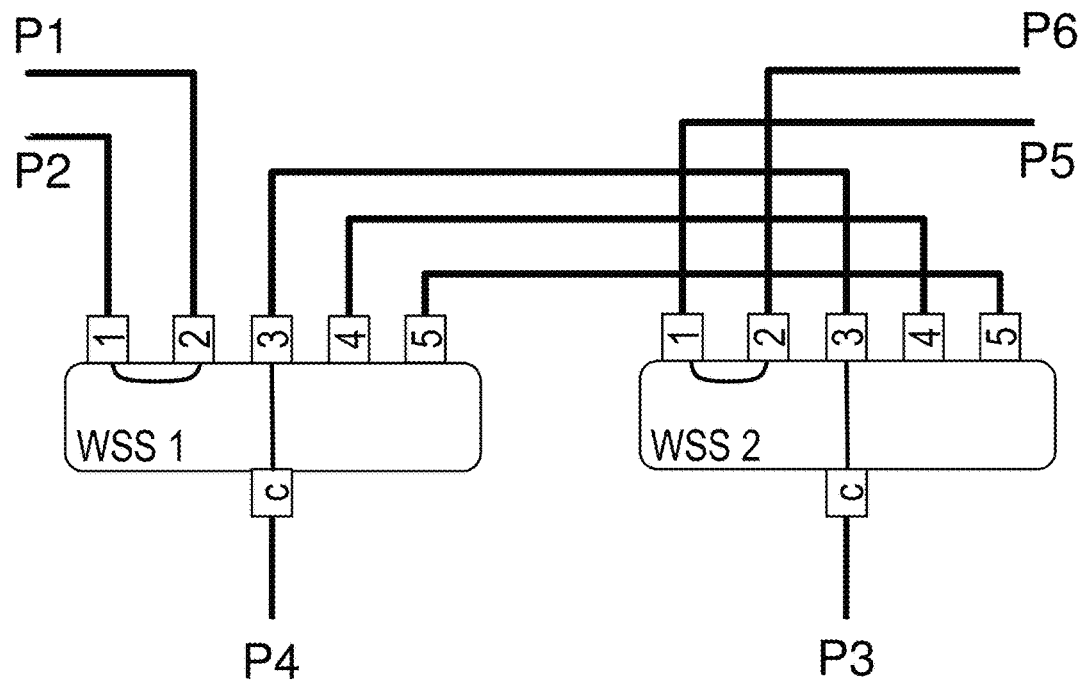
FIG. 13b is a further schematic block diagram depicting embodiments of a 6×6 OXC comprising multiple optical WSSs according to embodiments herein.

Also, when the wavelength is routed from the common port c to the third physical tributary port 3 it provides connectivity between the first physical tributary port 1 and the second physical tributary port 2, indicated by a solid lines in FIG. 13b.

Figure 13C:
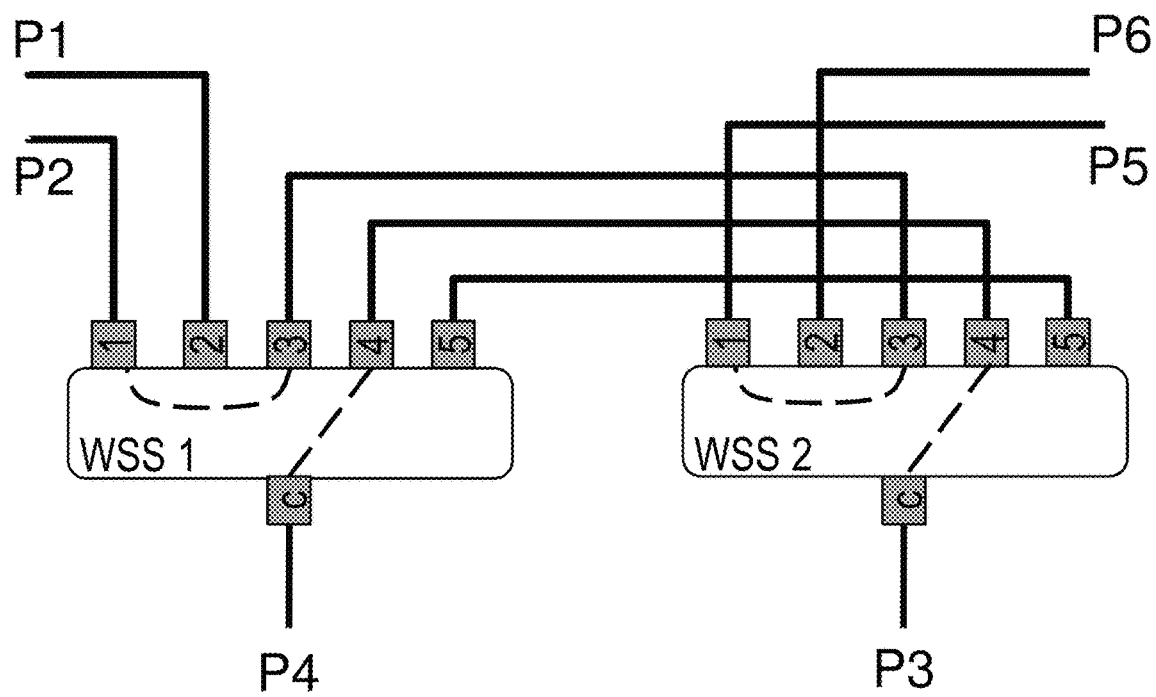
FIG. 13c is a further schematic block diagram depicting embodiments of a 6×6 OXC comprising multiple optical WSSs according to embodiments herein.

When the wavelength is routed from the common port c to the fourth physical tributary port 4, the WSS 1321, 1322 may be designed to provide connectivity between the first physical tributary port 1 and the third physical tributary port 3, indicated by dashed lines in FIG. 13c.

There are several ways of interconnecting or daisy chaining 1:5 WSSs. Two variants are proposed.

A first variant, illustrated by the optical network node 1310, is based on cascading according to the first scheme twice between type A ports, plus adding a third direct connection between the fifth physical tributary ports 5 of the two WSSs 1321, 1322 in FIG. 13a.

Figure 14:
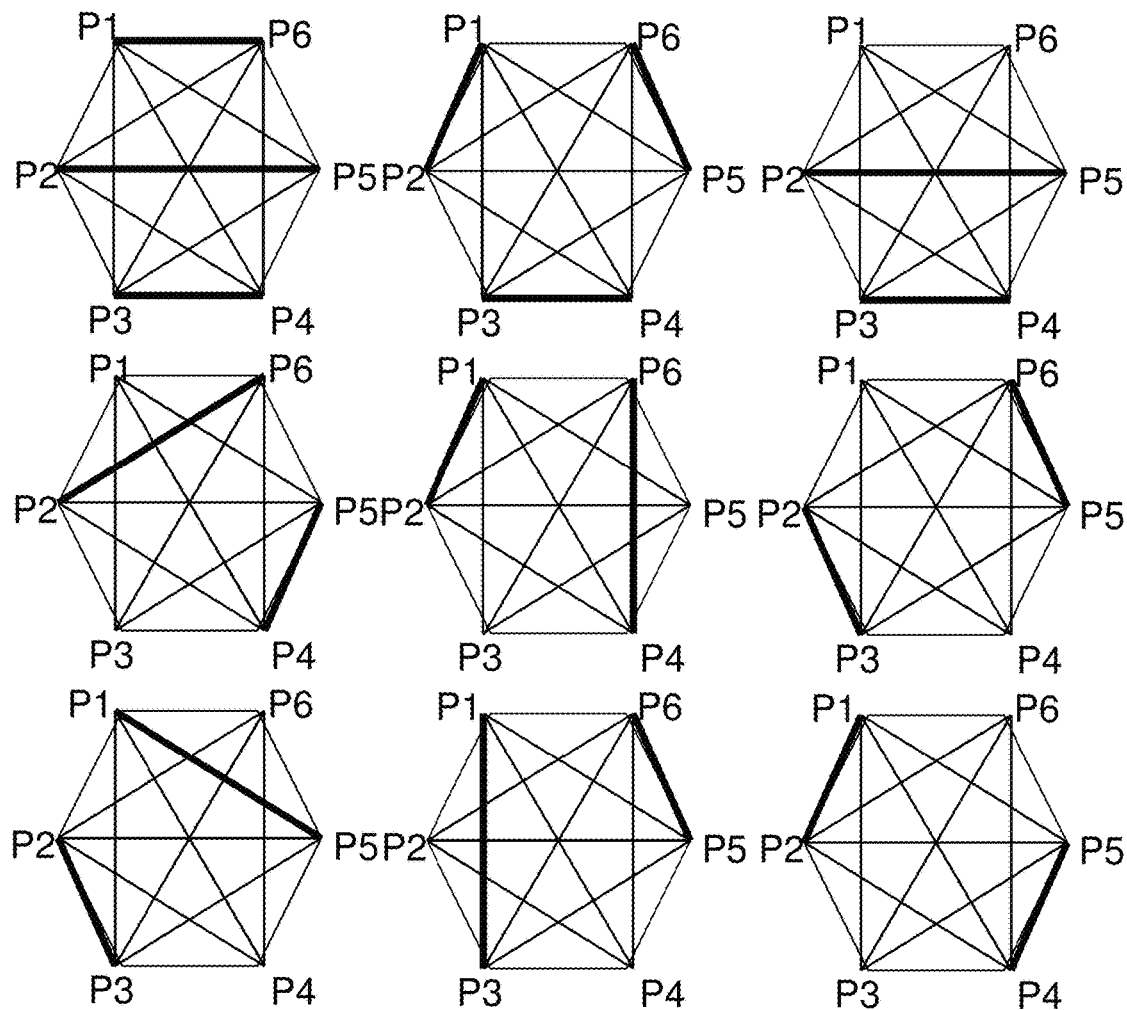
FIG. 14 illustrates connectivity properties for the 6×6 OXC in FIGS. 13a-c.

The first variant of the 6×6 OXC provides connectivity between each pair of input and output ports P1-P6, although there are some blocking constraints. For several combinations of pairs, simultaneous connections may be offered for a given wavelength band. This is illustrated in FIG. 14 where 'bold' connection lines illustrate combinations of simultaneous connections that are possible for a given wavelength band. A target use of this 6×6 OXC is for low cost networks where some flexibility is needed.

Figure 15:
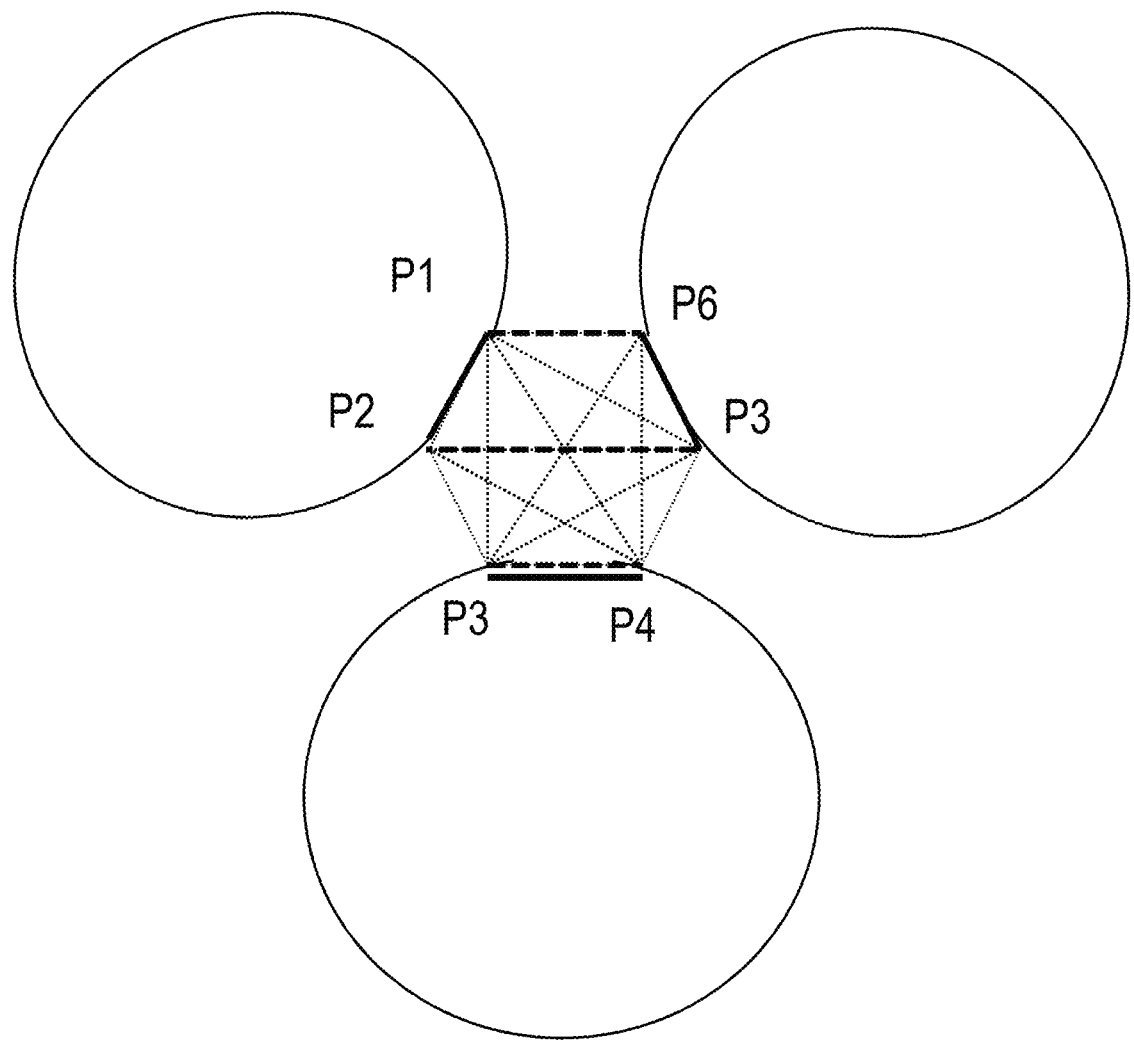
FIG. 15 illustrates a use case for the 6×6 OXC in FIGS. 13a-c.

FIG. 15 illustrates a first interconnecting network node 1510, comprising the first variant of the 6×6 OXC. The first interconnecting network node 1510 may for example be used in a first configuration to interconnect three rings P1-P2, P3-P4, P5-P6, illustrated with solid lines.

The first interconnecting network node 1510 may then re-configure to a second configuration to combine two of the rings to a larger logical ring, illustrated with dashed lines, for specific wavelengths.

The first configuration completes the rings whilst the second configuration enables two rings to be interconnected to a single logical ring.

Figure 16:
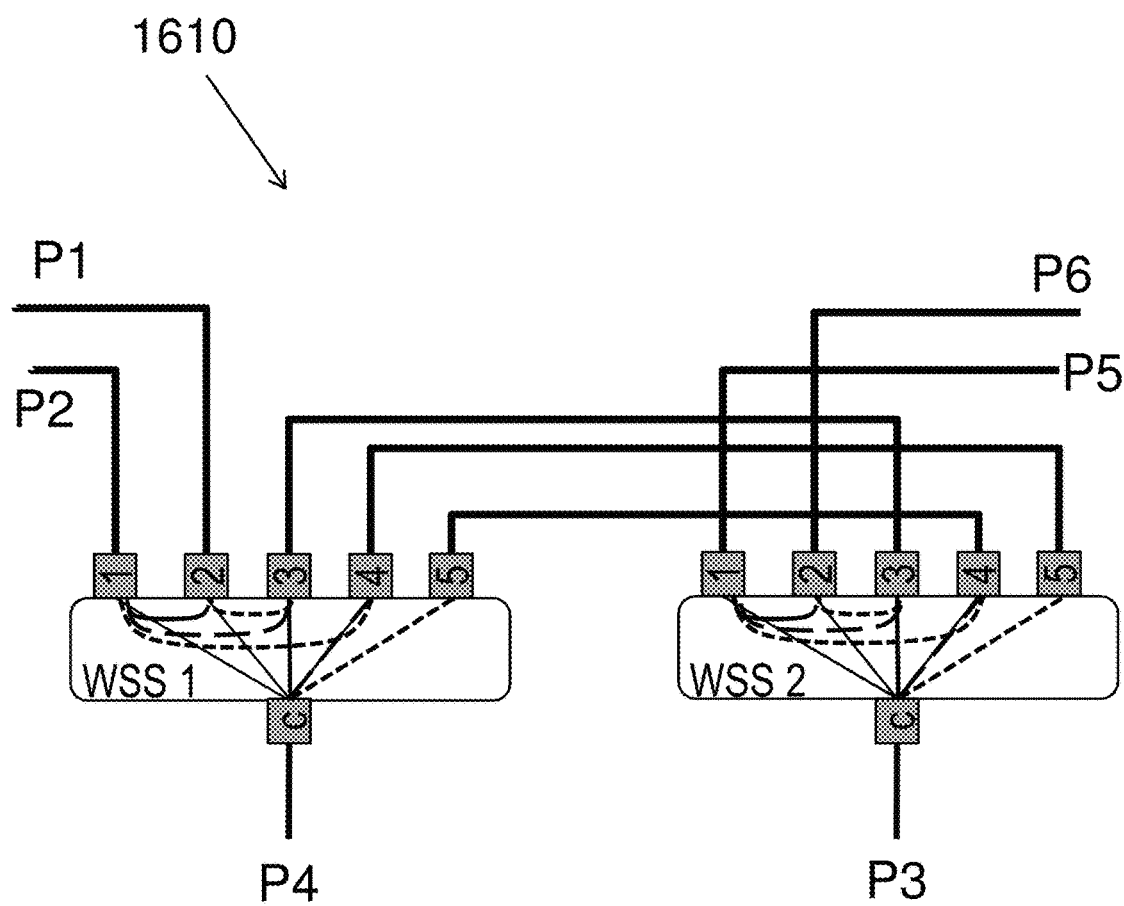
FIG. 16 is a schematic block diagram depicting further embodiments of a 6×6 OXC comprising multiple optical WSSs according to embodiments herein.
Figure 17:
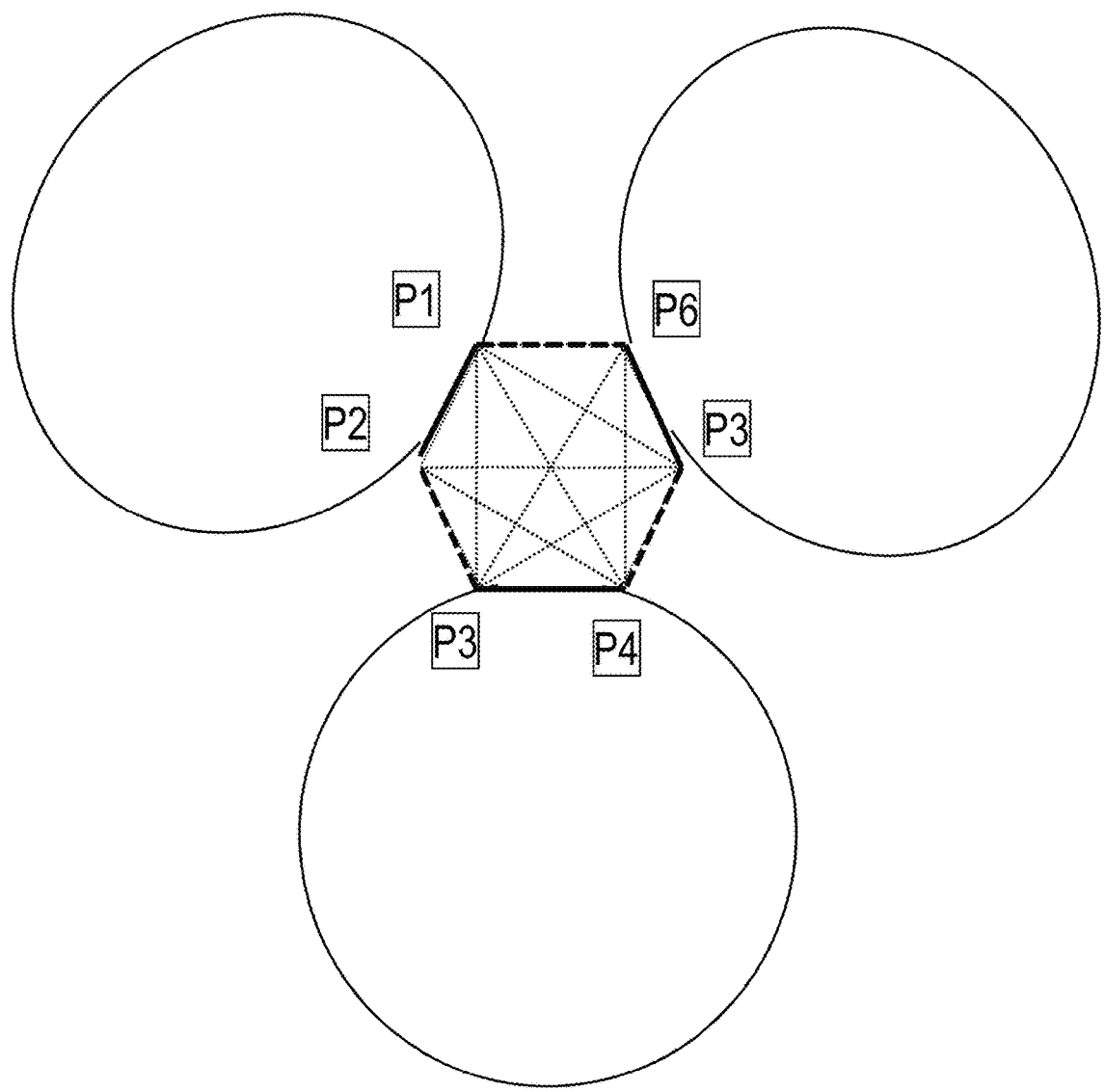
FIG. 17 illustrates a use case for the 6×6 OXC in FIG. 16.

A second variant of the 6×6 OXC is illustrated by the optical network node 1610 depicted in FIG. 16. The second variant of the 6×6 OXC is based on cascading two WSSs 1621, 1622 according to the first scheme and the second scheme simultaneously. The second variant of the 6×6 OXC have slightly different connectivity properties compared with the first variant of the 6×6 OXC. The second variant of the 6×6 OXC may be used as an interconnection point between three optical rings for the case when it may be beneficial for given wavelengths to combine all three optical rings to a single logical optical ring illustrated with dashed lines in FIG. 17. The solid and dashed lines in FIG. 17 illustrate two possible routing configurations for given wavelengths. The solid configuration completes the optical rings while the dashed configuration enables all optical rings to be interconnected to form a single logical ring.

Figure 18:
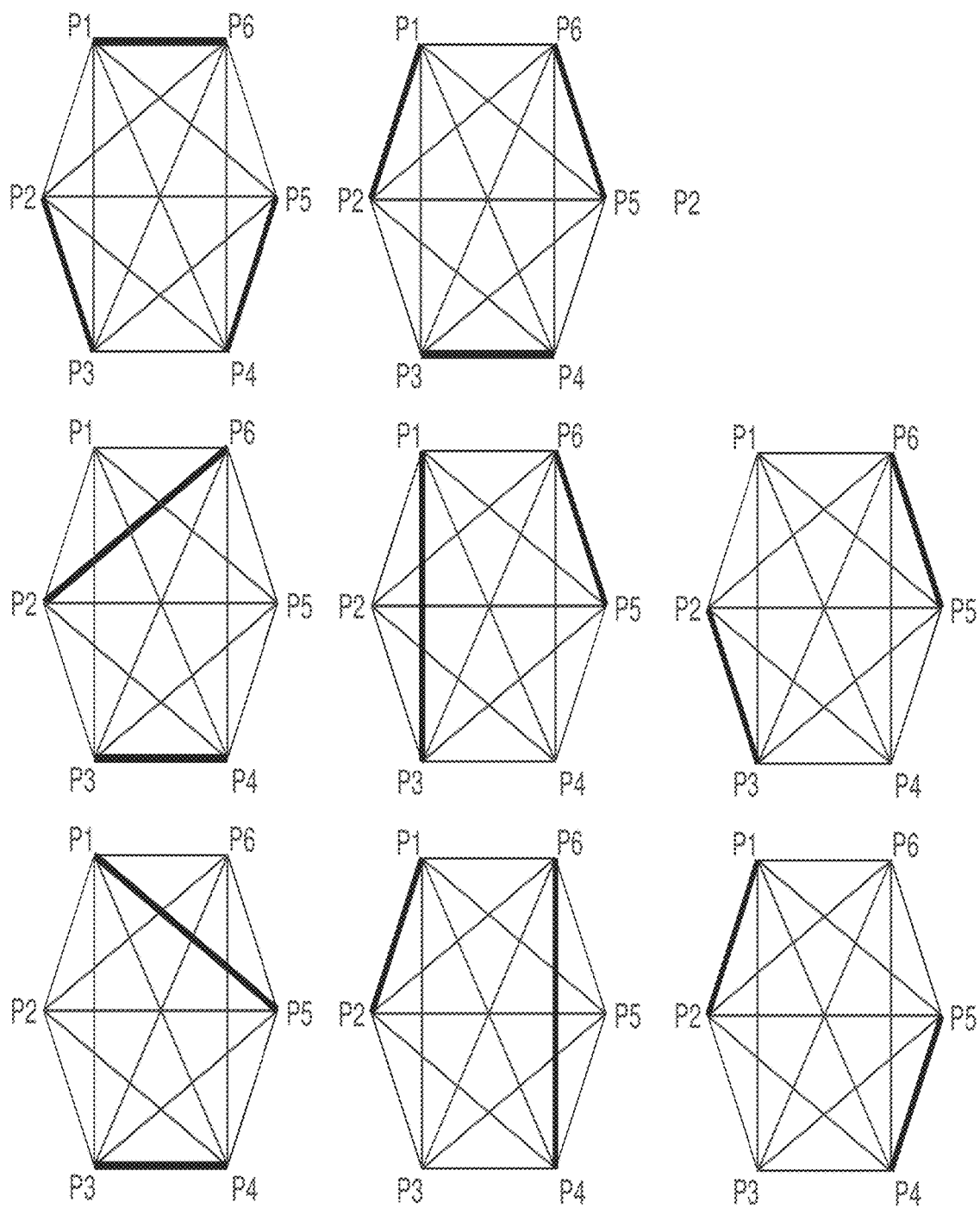
FIG. 18 illustrates connectivity properties for the 6×6 OXC in FIG. 16.

FIG. 18 presents connectivity properties for the second variant of the 6×6 OXC. Bold lines illustrate different cases of more than one simultaneous connection for a given wavelength that may be supported by the second variant of the 6×6 OXC.

Embodiments herein are also directed towards optical networks, for example employed in radio access networks. Radio access network scenarios with centralized baseband are gaining interest. Centralized baseband means that a base station BaseBand Unit (BBU) or base station digital unit is connected via a fronthaul link to a remote radio head and antenna. The BBU is usually in a centralized location. The fronthaul link may be part of an optical network. Such scenarios require transport solutions able to carry digitalized baseband, e.g. Common Public Radio Interface (CPRI), between Remote Radio Units (RRU) and centralized baseband hotels, such as the BBU.

It is expected that some degree of flexibility will be needed in fronthaul transport in order to facilitate service provisioning and to provide a platform for efficient resource usage.

For example, with increasing small cell densification one may expect a larger degree of traffic dynamicity in the outer parts of the radio access network as traffic fluctuations may be more pronounced over the coverage area of a small cell compared to a macro. Small cell deployment may also lead to an increasing need for provisioning flexibility in order to adjust to an evolving urban environment where new cells may be added and old cells removed based on changing traffic patterns and evolving competitive landscapes among wireless access providers. By exploiting embodiments herein, an optical network architecture with a desired flexibility may be achieved at low cost and low complexity.

Figure 19:
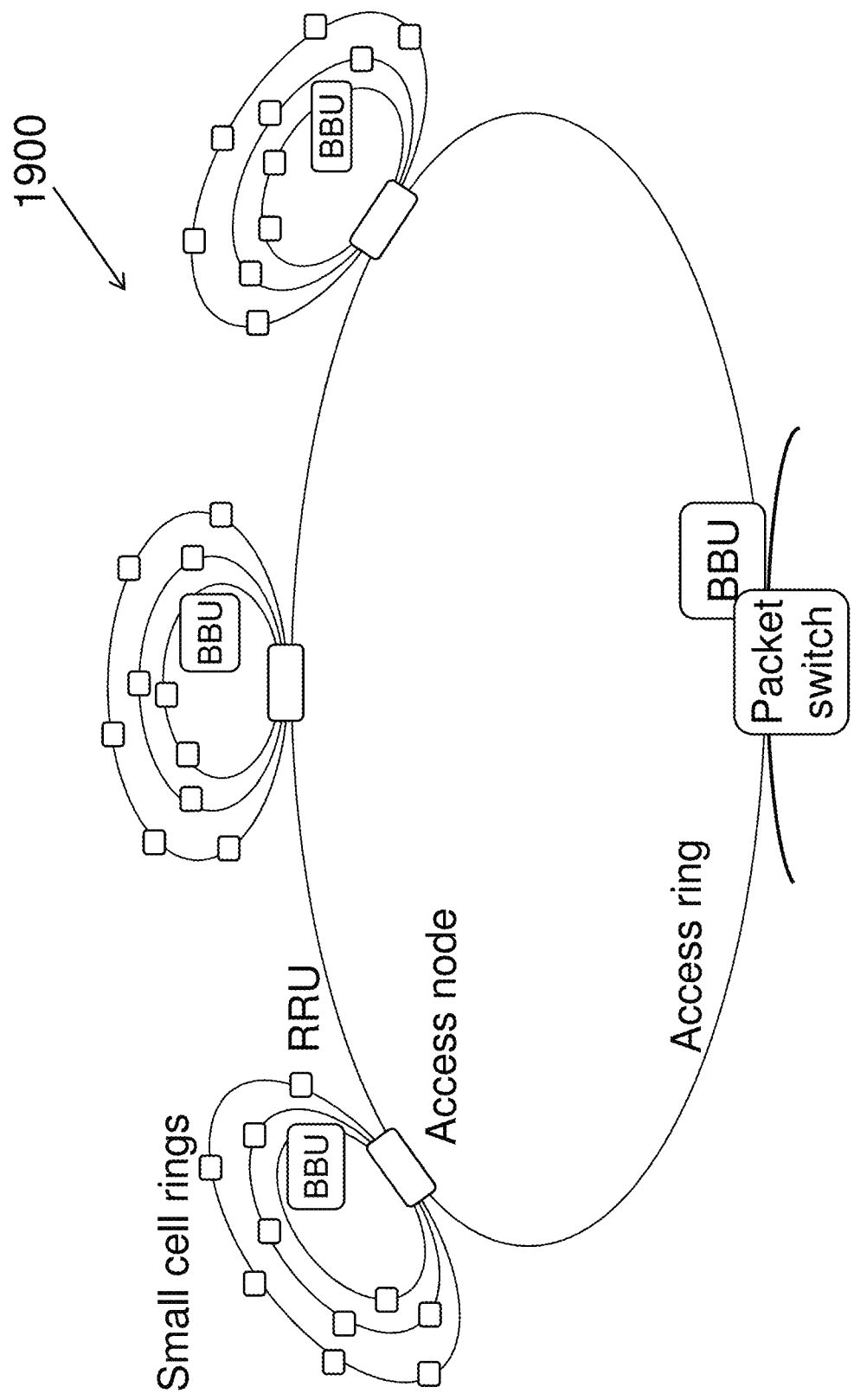
FIG. 19 is a schematic block diagram depicting an optical network.

FIG. 19 illustrates a general optical network architecture for this use case where small cells are connected via "small cell" optical rings and these optical rings are interconnected at optical access nodes. The optical access nodes are in turn interconnected by an access ring.

Figure 20:
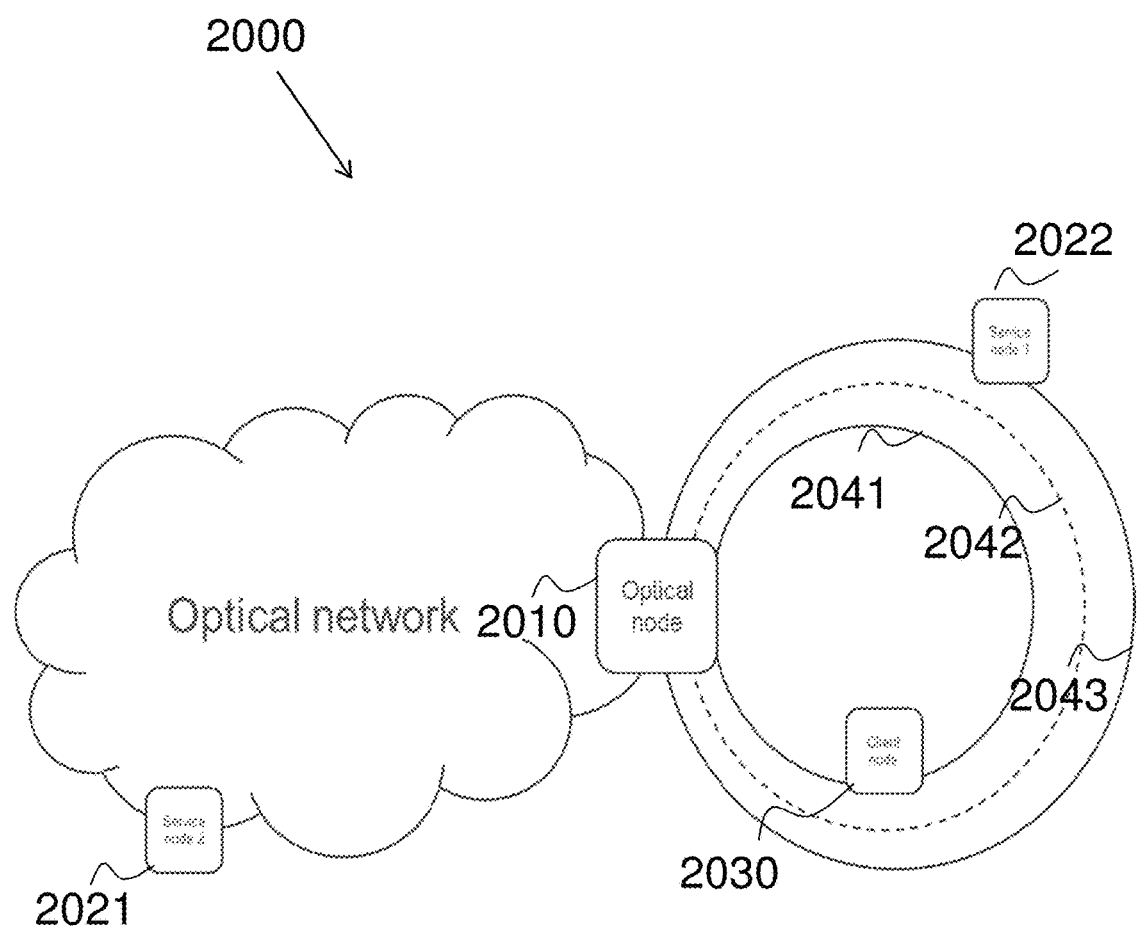
FIG. 20 is a schematic block diagram depicting embodiments of an optical network comprising optical network nodes according to embodiments herein.

Embodiments of an optical network 2000 will now be described with reference to FIG. 20.

The optical network 2000 comprises at least one optical network node 710, 2010, according to embodiments herein. In other words, the optical network node 710, 2010 comprises one or more optical WSSs 200 according to embodiments herein. The optical network node 710, 2010 may be an optical access network node.

The optical network 2000 further comprises a first service node 2021, and a second service node 2022. The service nodes 2021, 2022 may each be a local BBU, also referred to as a local base band hotel.

The optical network 2000 further comprises a client node 2030. The client node 2030 may be a RRU.

The optical network 2000 further comprises a first optical access ring 2041 and a second optical access ring 2042. The optical access network 2000 may further comprise a third optical access ring 2043. The first, second and third optical access rings 2041, 2042, 2043 may collectively be referred to as small cell optical rings 2041, 2042, 2043.

The optical network node 710, 2010 is connected to the first optical access ring 2041 and the second optical access ring 242. The first service node 2021 is connected to the first optical access ring 2041. The client node 2030 is connected to the second optical access ring 2042. The second service node 2022 is connected to any other part of the optical access network 2000.

The optical network node 710, 2010 is adapted to route the first optical signal on a first wavelength band between the first service node 2021 and the client node 2030. The optical network node 710, 2010 is further adapted to route the second optical signal on a second wavelength band between the first service node 2021 and the second service node 2022.

In some embodiments the optical network 2000 comprises three or more optical access rings 2041, 2042, 2043. Then the optical network node 710, 2010 may be adapted to route the first optical signal on the first wavelength band between the first service node 2021 and the client node 2030 via any one or more out of: the first optical access ring 2041, the second optical access ring 2042, and the third optical access ring 2043.

The first service node 2021 may perform baseband processing.

In some embodiments the first service node 2021 performs packet aggregation.

The first service node 2021 may perform channel multiplexing aggregating multiple lower rate optical signals to fewer number of higher rate optical signals.

Figure 21:
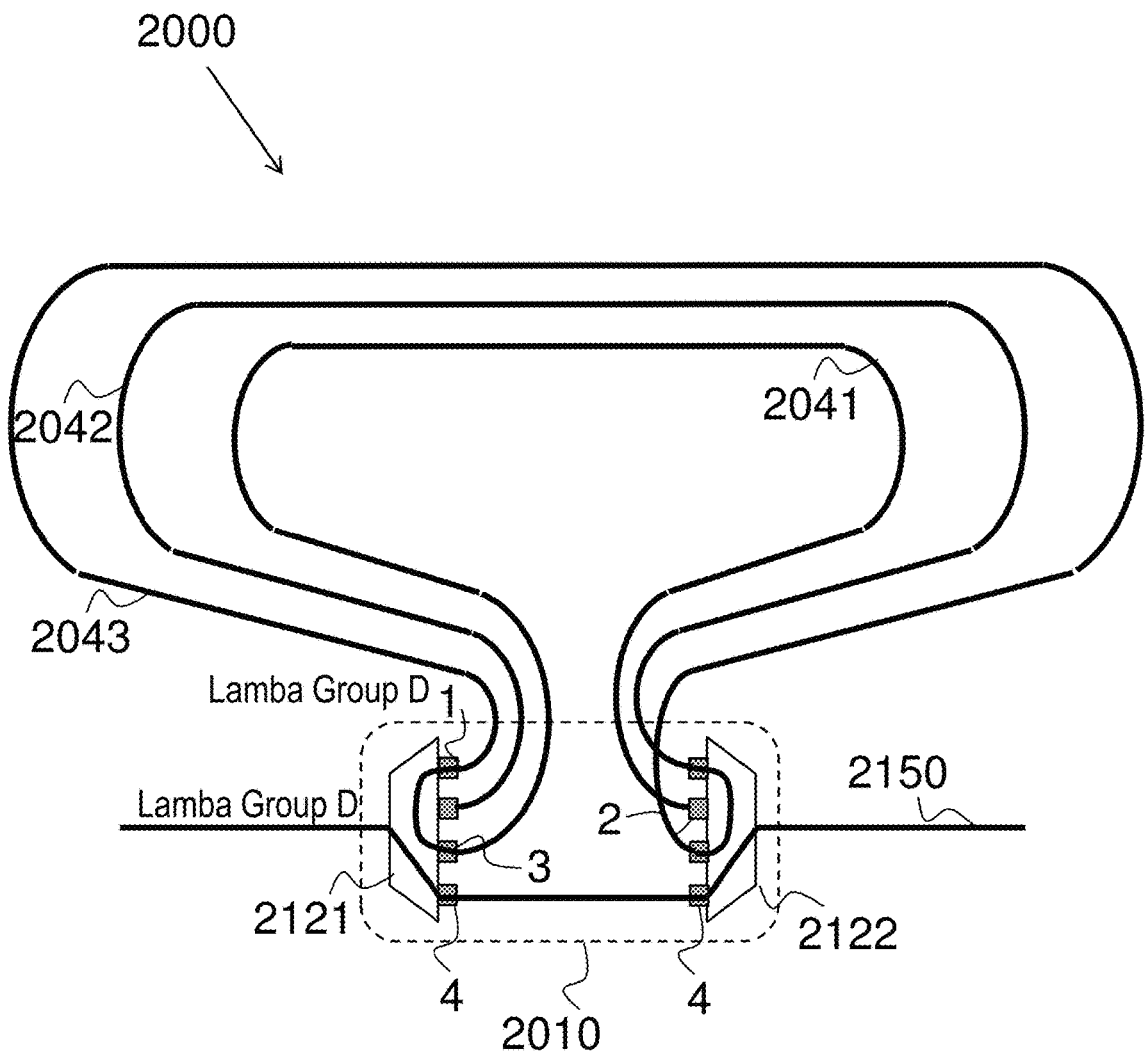
FIG. 21 is a schematic block diagram depicting further embodiments of an optical network comprising optical network nodes according to embodiments herein.

In some embodiments, illustrated in FIG. 21, the optical network node 710, 2010 may comprise the first optical WSS 2121 and the second optical WSS 2122, each according to embodiments herein, such as the optical WSS 200.

The optical network node 710, 2010 may be adapted to switch or route an optical signal from at least one tributary port, such as from the first physical tributary port 1 via the third physical tributary port 3, comprised in the first optical WSS 2121 to at least one tributary port, such as the second physical tributary port 2, comprised in the second optical WSS 2122.

As illustrated in FIG. 21, the optical network node 710, 2010 may be an optical access node. The first optical WSS 2121 and the second optical WSS 2121 may each be a 1:4 WSS for multidirectional switching according to embodiments herein. The fourth physical tributary port 2134 of the first optical WSS 2121 may be interconnected with the fourth physical tributary port 2144 of the second optical WSS 2122 to form a bypass connection for a fourth optical access ring 2150. The small cell optical rings 2041, 2042, 2043 are connected to the other tributary ports of each WSS 2121, 2122. Since the WSSs 2121, 2122 internally may provide connectivity between the first physical tributary port 1 and the third physical tributary port 3 the small cell optical rings 2041, 2042, 2043 are nested in such a manner that any client node on any small cell optical ring 2041, 2042, 2043 may be connected to any client node on any optical ring 2041, 2042, 2043.

FIG. 21 also illustrates how a wavelength band, e.g. Lambda group D, may be used to simultaneously provide local connectivity in the small cell rings 2041, 2042, 2043 and to provide bypass for connectivity between elements of other access nodes.

Figure 22A:
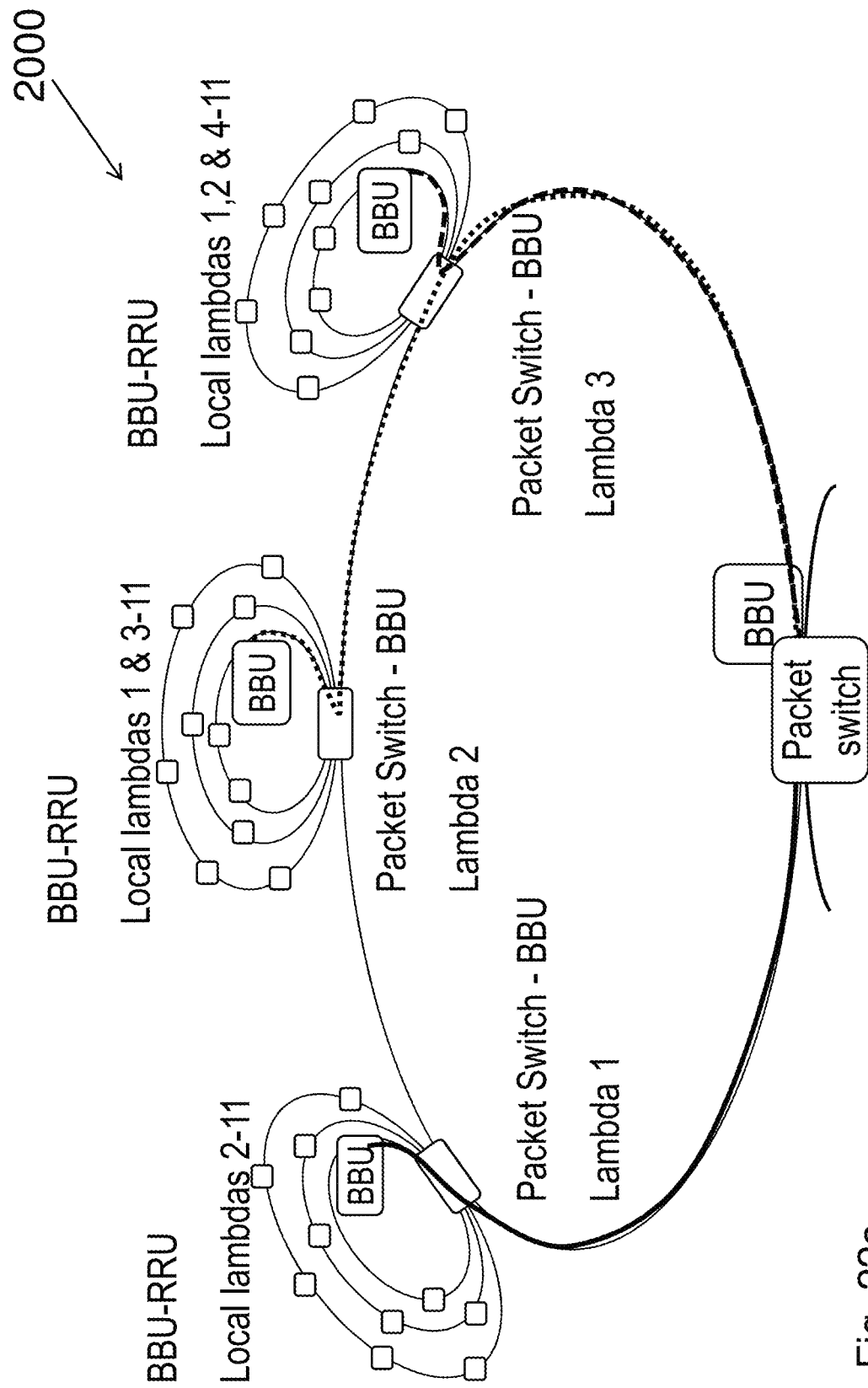
FIG. 22a is a schematic block diagram depicting further embodiments of an optical network comprising optical network nodes according to embodiments herein.
Figure 22B:
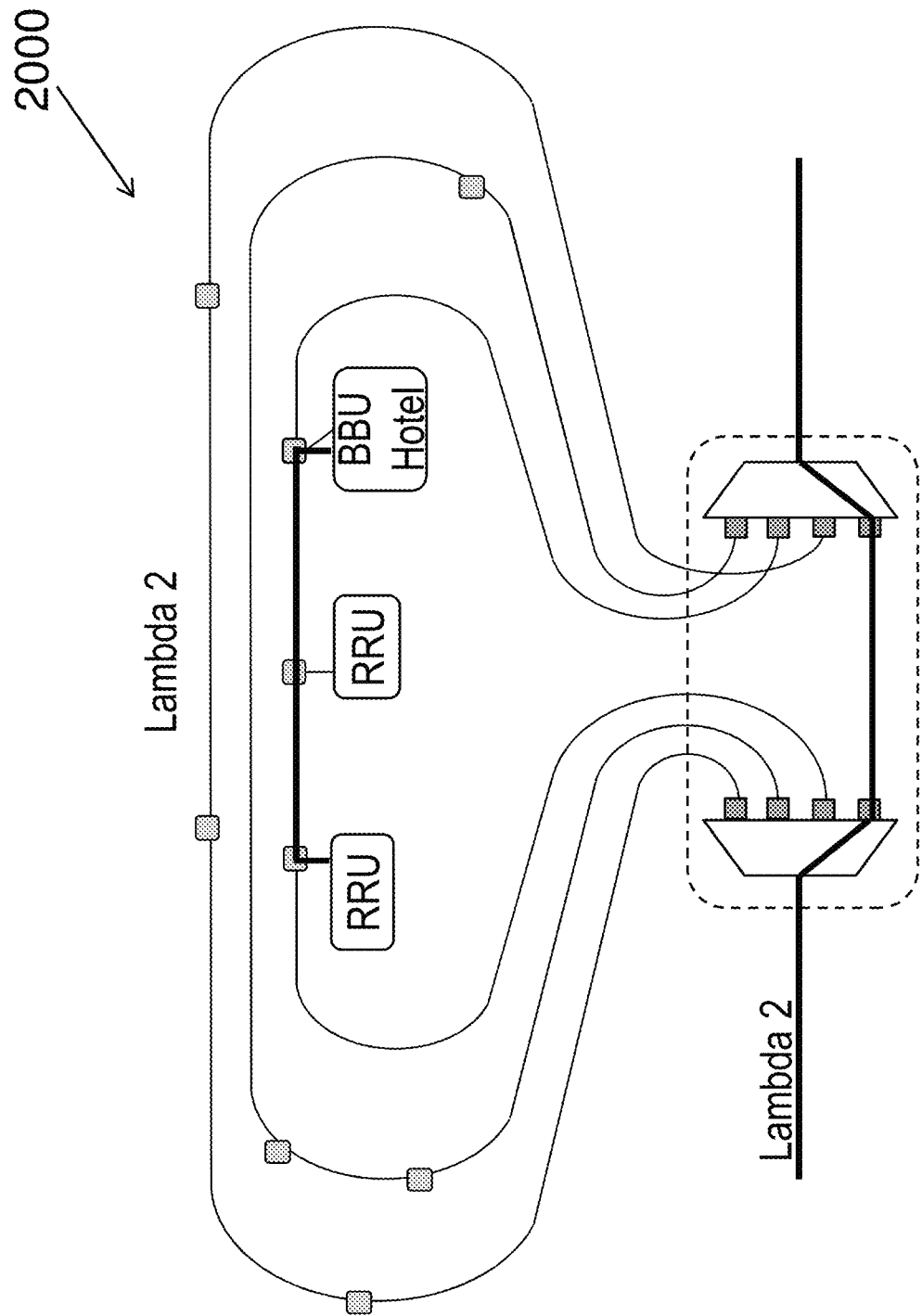
FIG. 22b is a schematic block diagram depicting further embodiments of an optical network comprising optical network nodes according to embodiments herein.

The first service node 2021 may serve all the small cell rings of the access site. FIG. 22a illustrate an example of wavelength allocation where three wavelength channels, Lambda 1-3, are used to serve, i.e. backhaul, three local baseband hotels via the access ring. Simultaneously, these wavelengths, Lambda 1-3, and other wavelengths, Lambda 4-11, are used to serve the fronthaul connectivity needs between the small cells and the baseband hotels. FIG. 22b further illustrates the same example.

Figure 23:
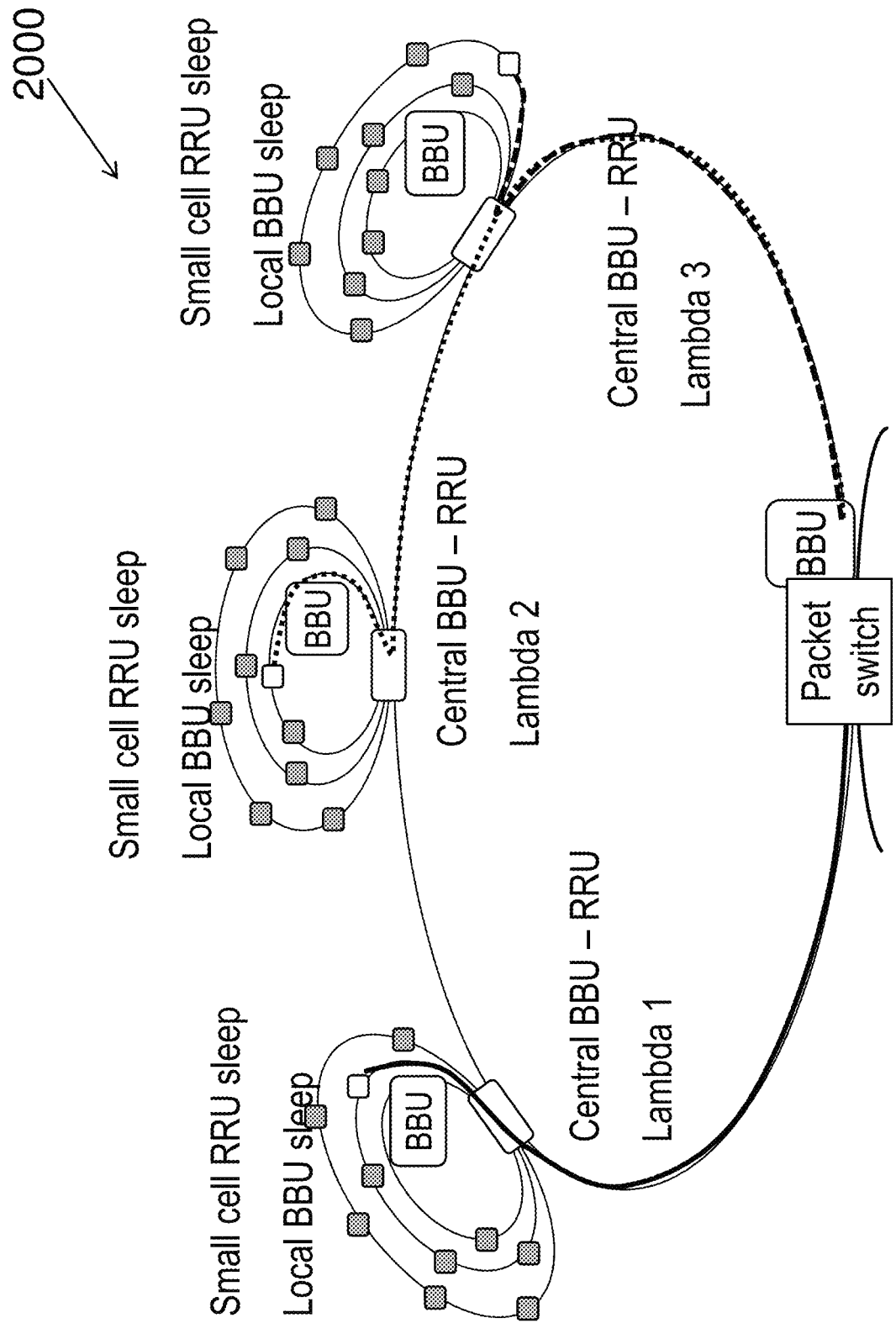
FIG. 23 is a schematic block diagram depicting further embodiments of an optical network comprising optical network nodes according to embodiments herein.

Embodiments herein provide a scalable transport solution where the total number of RRU clients is not limited by the maximum number of wavelength channels in the access ring. It enables RRU clients to be connected to a local BBU. At the same time it still allows for each client to be accessed via the global access ring. One use of this feature may be to enable low power configurations where the local baseband hotels are put to standby and few selected cells are aggregated to a single hotel as illustrated in FIG. 23.

Figure 24:
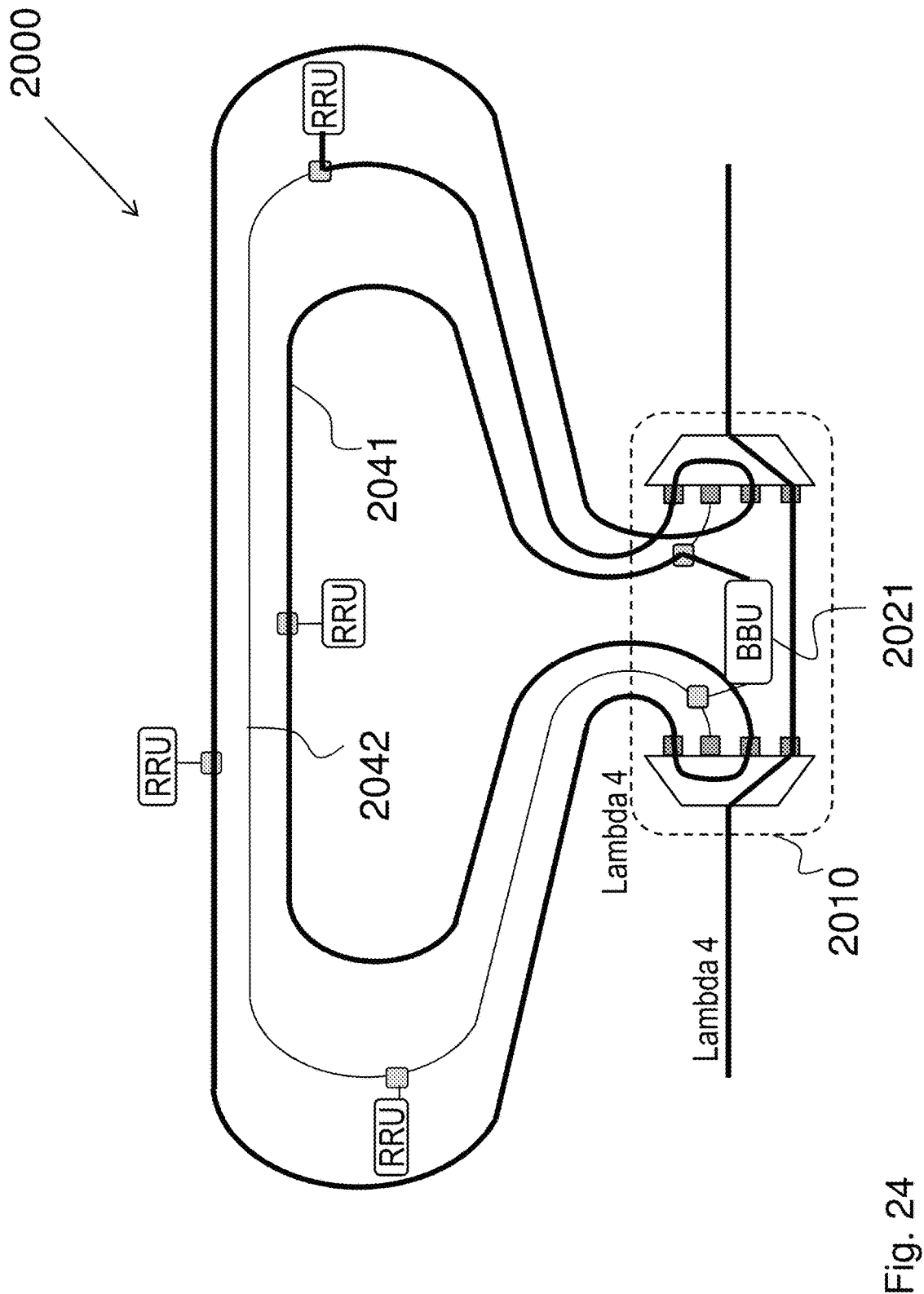
FIG. 24 is a schematic block diagram depicting further embodiments of an optical network comprising optical network nodes according to embodiments herein.

An alternative of the presented architecture is depicted in FIG. 24, where the local BBU is attached to the small access rings via two tributary ports to provide full protection for connections between each access RRU and the local BBU.

In other words, the first service node 2021 may be connected to the first access ring 2041 and the second access ring 2042 near a head or a tail of each access ring 2041, 2042. In this way the connection between the first service node 2021 and the client node 2030 is protected against any single fiber cut on any of the optical rings 2041, 2042, 2043 connected to the optical network node 710, 2010.

In some embodiments the first service node 2021 is connected to the head or the tail of the second access ring 2042 from which there is no direct optical path to any other access ring 2041, 2043 through the optical network node 710, 2010 without passing through the second access ring 2042.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. A method in an optical Wavelength Selective Switch (WSS) for multidirectional switching of optical signals, wherein the optical WSS comprises a reflective element, a first tributary port and a second tributary port, the method comprising:

switching an optical signal between the first tributary port and the second tributary port with the reflective element, wherein the optical signal is input to the first tributary port and output on the second tributary port.

2. The method according to claim 1, wherein the switching the optical signal between the first tributary port and the second tributary port comprises adjusting the reflective element, causing a first angle, defined by an incident beam of the optical signal, incident on the reflective element, and the normal of an effective reflective plane of the reflective element, to equal a second angle, defined by the normal and a reflected beam of the optical signal, reflected from the reflective element.

3. The method according to claim 2, further comprising:
adjusting three or more third angles, to have a same magnitude, wherein each third angle is defined by two adjacent optical beams incident on, or reflected from, the reflective element.

4. The method according to claim 1, wherein the optical WSS further comprises a third port and a fourth port, the method comprising:
configuring the optical WSS to switch a first optical signal on a specific wavelength band, between the third port and the fourth port, with the reflective element; and
the switching comprises to switch a second optical signal, within the same specific wavelength band, between the first tributary port and the second tributary port, with the reflective element.

5. The method according to claim 4, further comprising:
adjusting three or more third angles, to have a same magnitude, wherein each third angle is defined by two adjacent optical beams incident on, or reflected from, the reflective element.

6. The method according to claim 4, wherein the third port is a third tributary port and the fourth port is a fourth tributary port.

7. The method according to claim 4, wherein the third port is a third tributary port, and the fourth port is a common port.

8. The method according to claim 7, further comprising selecting the third port as the tributary port having a largest angle defined by the first angle or the second angle.

9. The method according to claim 7, wherein the first tributary port is adjacent to the common port and the second tributary port is adjacent to the third tributary port.

10. An optical Wavelength Selective Switch (WSS) for multidirectional switching of optical signals, wherein the optical WSS comprises a reflective element, a first tributary port and a second tributary port, the optical WSS is configured to:
switch an optical signal between the first tributary port and the second tributary port with the reflective element,
wherein the optical signal is input to the first tributary port and output on the second tributary port.

11. The optical WSS according to claim 10, configured to switch the optical signal between the first tributary port and the second tributary port by adjusting the reflective element, causing a first angle, defined by an incident beam of the optical signal, incident on the reflective element, and the normal of an effective reflective plane of the reflective element, to equal a second angle, defined by the normal and a reflected beam of the optical signal, reflected from the reflective element.

12. The optical WSS according claim 11, further configured to adjust three or more third angles, to have the same magnitude, wherein each third angle is defined by two adjacent optical beams incident on, or reflected from, the reflective element.

13. The optical WSS according to claim 10, wherein the optical WSS further comprises a third port and a fourth port, and the optical WSS is configured to:
configure the optical WSS to switch a first optical signal on a specific wavelength band, between the third port and the fourth port, with the reflective element; and
switch a second optical signal, within the same specific wavelength band, between the first tributary port and the second tributary port, with the reflective element.

14. The optical WSS according claim 13, further configured to adjust three or more third angles, to have the same magnitude, wherein each third angle is defined by two adjacent optical beams incident on, or reflected from, the reflective element.

15. The optical WSS according to claim 13, wherein the third port is a third tributary port and the fourth port is a fourth tributary port.

16. The optical WSS according to claim 13, wherein the third port is a third tributary port, and the fourth port is a common port.

17. The optical WSS according to claim 16, further configured to select the third port as the tributary port having a largest angle defined by the first angle or the second angle.

18. The optical WSS according claim 16, further configured to switch the second optical signal between a tributary port adjacent to the common port and a tributary port adjacent to the third tributary port.

19. An optical network node for multidirectional switching of optical signals in a communications network, the optical network node comprising one or more optical WSSs, wherein the optical WSSs each comprise a reflective element, a first tributary port and a second tributary port and each are configured to:
switch an optical signal between the first tributary port and the second tributary port with the reflective element,
wherein the optical signal is input to the first tributary port and output on the second tributary port.

20. The optical network node of claim 19, wherein:
the optical network node is part of an optical network comprising at least a first service node, a second service node, a client node, a first optical access ring, and a second optical access ring;
the optical network node is connected to the first optical access ring and the second optical access ring;
the first service node is connected to the first optical access ring;
the client node is connected to the second optical access ring;
the second service node is connected to any other part of the optical network, and wherein the optical network node is configured to:
route a first optical signal on a first wavelength band between the first service node and the client node; and
route a second optical signal on a second wavelength band between the first service node and the second service node.

* * * * *